United States Patent [19]

Wemekamp

[11] 4,012,979
[45] Mar. 22, 1977

[54] MUSIC TEACHING APPARATUS

[75] Inventor: Henry Wemekamp, Willowdale, Canada

[73] Assignee: Computeacher Limited, Toronto, Canada

[22] Filed: Mar. 3, 1975

[21] Appl. No.: 554,873

[52] U.S. Cl. .................................. 84/1.01; 84/464; 84/478; 84/DIG. 22
[51] Int. Cl.² ...................... G09B 15/08; G10H 1/00
[58] Field of Search ................. 84/1.01, 1.03, 1.17, 84/1.24, 115, 464, 470, 478, 445, DIG. 12, DIG. 22, 461, 462

[56] References Cited

UNITED STATES PATENTS

| | | | |
|---|---|---|---|
| 3,552,256 | 1/1971 | Soanes et al. | 84/478 |
| 3,771,406 | 11/1973 | Wheelwright | 84/464 |
| 3,821,712 | 6/1974 | Wetzel | 84/1.01 X |
| 3,878,750 | 4/1975 | Kapps | 84/1.01 |
| 3,881,390 | 5/1975 | Gullickson | 84/478 |
| 3,886,838 | 6/1975 | Scherrer | 84/470 |
| 3,889,568 | 6/1975 | Amaya | 84/1.01 |
| 3,890,871 | 6/1975 | Oberheim | 84/1.01 |
| 3,955,459 | 5/1976 | Mochida et al. | 84/1.01 |
| 3,955,466 | 5/1976 | Goldmark | 84/470 |

Primary Examiner—Stanley J. Witkowski
Attorney, Agent, or Firm—Rogers, Bereskin & Parr

[57] ABSTRACT

An apparatus for teaching a person to play a musical instrument, particularly a keyboard instrument. The chord and melody notes of a musical passage are stored in a memory in the form of chord words and melody words each comprising a predetermined number of data elements. The data elements in each chord word represent all of the chord notes for a bar of the musical passage and in addition an indicator element which indicates whether the next word is a chord word or a melody word. The data elements in each melody word represent a melody note and timing for a bar of music and an indicator element. The data words are read out of the memory in a sequential manner. Each chord word is transferred into a chord storage register where it is held until the chord is correctly played. The melody words for the particular chord are transferred into a melody storage register at a predetermined rate depending on the timing data in each melody word. Each storage register includes display means for visually displaying the notes contained in each chord and melody word. The transfer of chord and melody words associated with a particular bar of the musical passage into their respective storage registers is halted unless the chord is correctly played.

10 Claims, 15 Drawing Figures

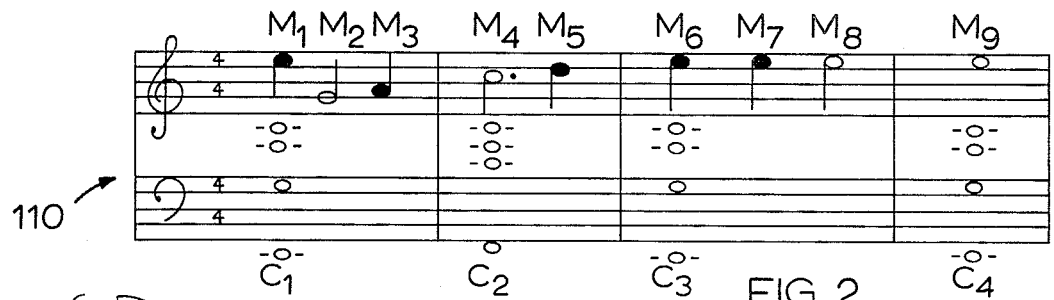
FIG. 2
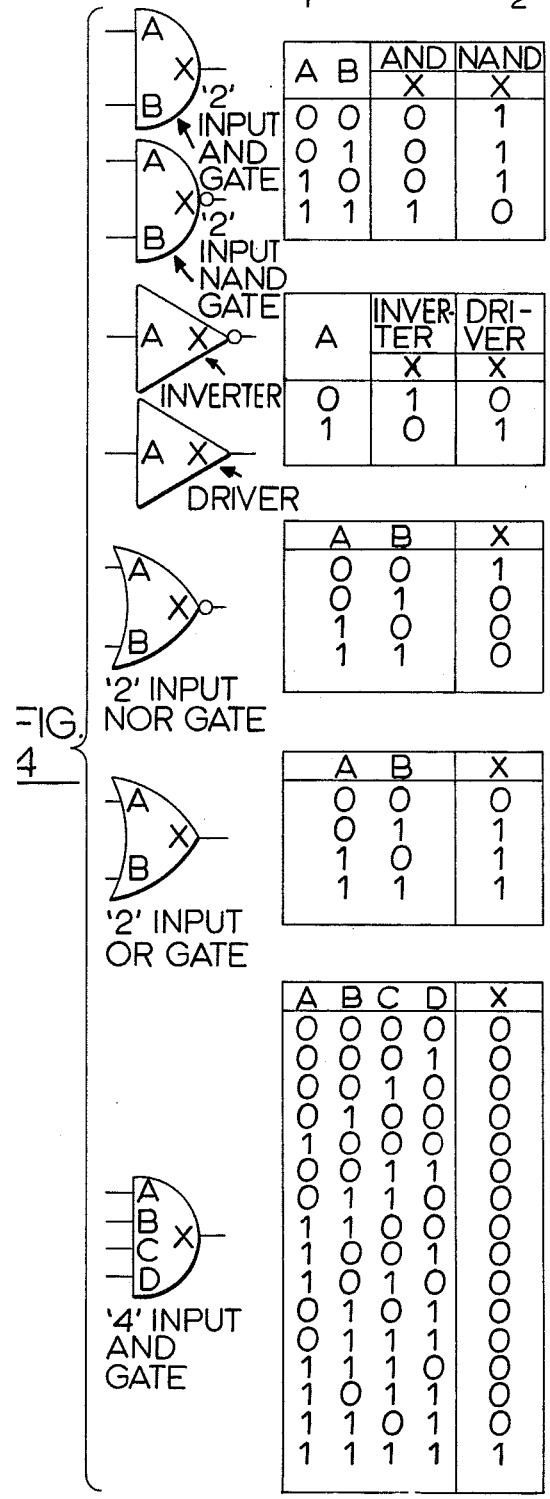
FIG. 4
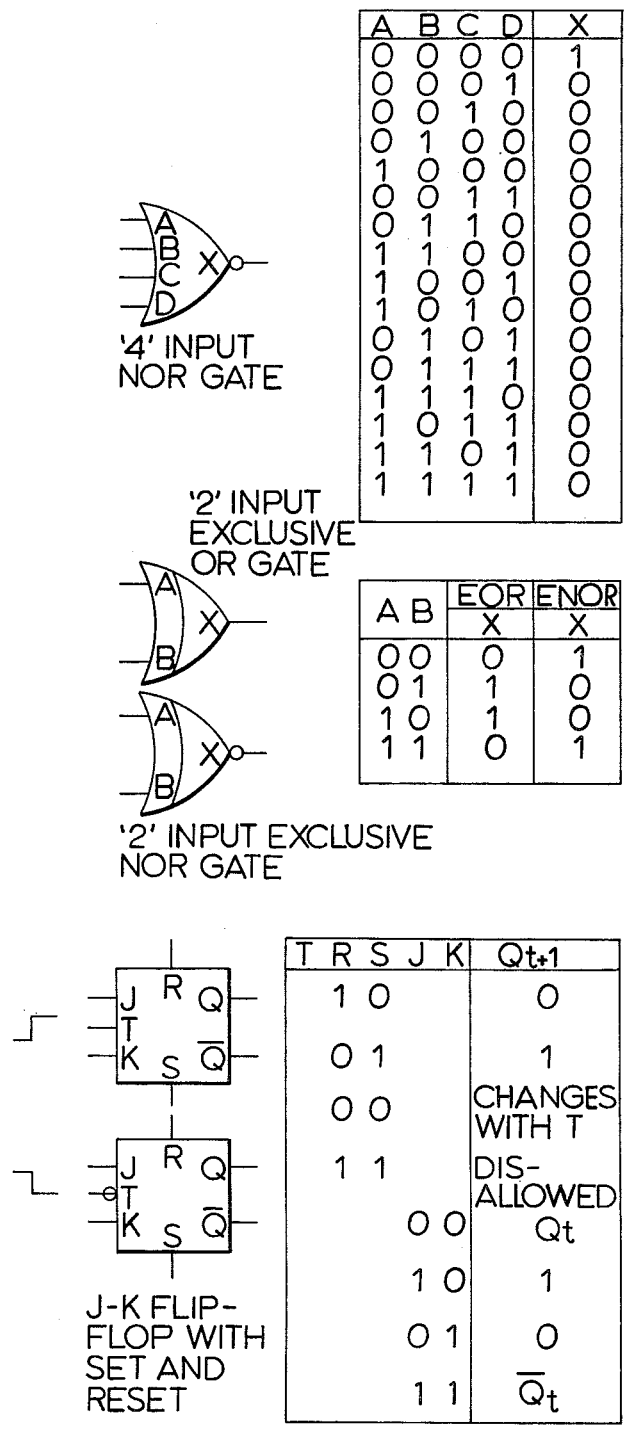

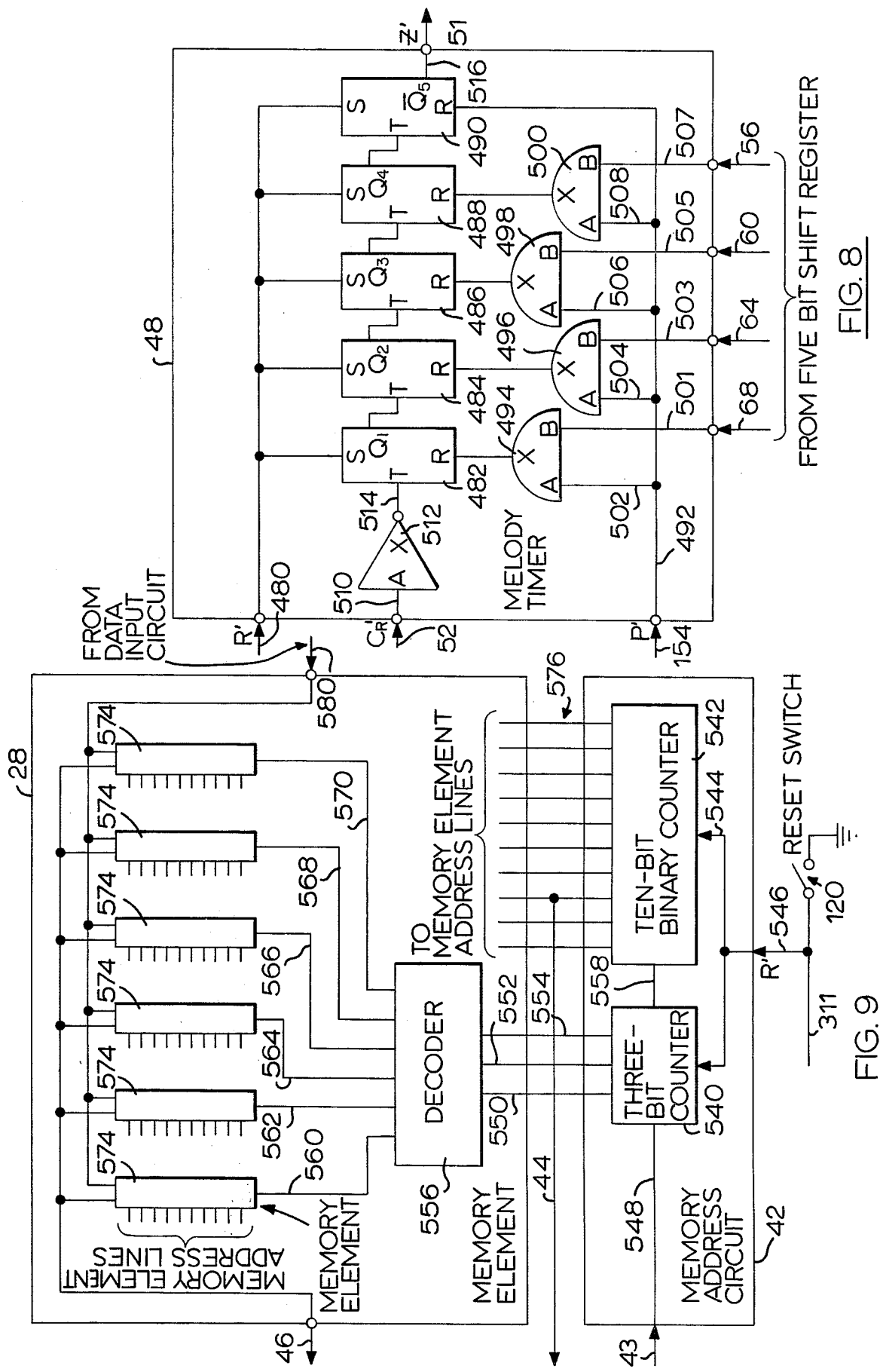

MUSIC TEACHING APPARATUS

This invention relates to an apparatus for teaching a student to play a musical instrument, particularly a keyboard instrument such as an organ or piano. Teaching devices of this kind have employed paper tape information storage and paper tape readers for controlling the illumination of a plurality of lamps positioned above the piano or organ keyboard. Each lamp is associated with a particular key and when illuminated indicates to the student that the associated key is to be played. A prior apparatus of this general kind is shown in U.S. Pat. No. 3,552,256 dated Jan. 5, 1971. Apparatus such as the above was of somewhat limited versatility owing to the use of a permanent type of data storage such as paper tape, and moreover such apparatus utilized an electro-mechanical tape transport mechanism which was quite bulky and noisy in operation.

These problems have been overcome in the present invention which utilizes a readily programmable self-contained electronic memory. The musical passage to be played by the student is programmed into the memory in the form of a series of binary coded digits called bits. Each bit represents a unit of information. A predetermined number of consecutive bits are arranged in a serial manner to form the elements of a data word. Each data word associated with a particular bar of the musical passage represents either a melody note and timing for the melody note or a number of notes making up a chord and the associated bass note accompaniment for the chord. A control logic circuit causes the data words to be read out of the data storage in a predetermined sequential manner according to the order in which the chords and melody notes occur in the musical passage to be played. The data elements in each chord word representing only the notes in the chord are transferred from the data storage to a chord storage register where the data is temporarily stored until the chord has correctly been played. Subsequently, the control logic circuit causes the next chord word to be read into the chord storage register. In the same manner the data elements in each melody word representing the melody note are read into a melody storage register. The melody words are transferred into the melody storage register at a predetermined rate depending on the timing data contained in each melody word. The timing data is extracted and used by the logic control circuit to control the length of time each melody note is held in the melody storage register. The chord and melody storage registers include circuit means for illuminating the lamp associated with a particular key at the correct time and for the required period of time. Consequently, the notes to be sounded by the student are clearly indicated in the correct order and with the proper tempo. The transfer of chord and melody words associated with a particular bar of the musical passage into their respective storage registers is halted unless the chord is correctly played.

According to one aspect, the invention consists of an apparatus for teaching a student to play a musical instrument comprising programmable data storage means for storing a sequence of predetermined data words, said data words containing elements which are indicative of predetermined musical notes to be played, said data words being stored at known locations in said data storage means, controllable logic means coupled to said data storage means for removing selected data words from said data storage means in a predetermined sequential order and including means for temporarily storing said removed data words until after the notes indicated by said data words have correctly been played, said logic means being responsive to a control signal, means for sensing the notes which have been played, means coupled to said sensing means for generating said control system after said notes have correctly been played, and display means coupled to said logic means for indicating visually the notes to be played.

In the drawings illustrating a preferred embodiment of the invention:

FIG. 2 is a portion of a line of music illustrating several melody and chord notes stored in the data storage register;

FIG. 4 is a diagrammatic view illustrating various types of logic elements used in a preferred embodiment of the invention and their associated truth tables.

Figure 1:
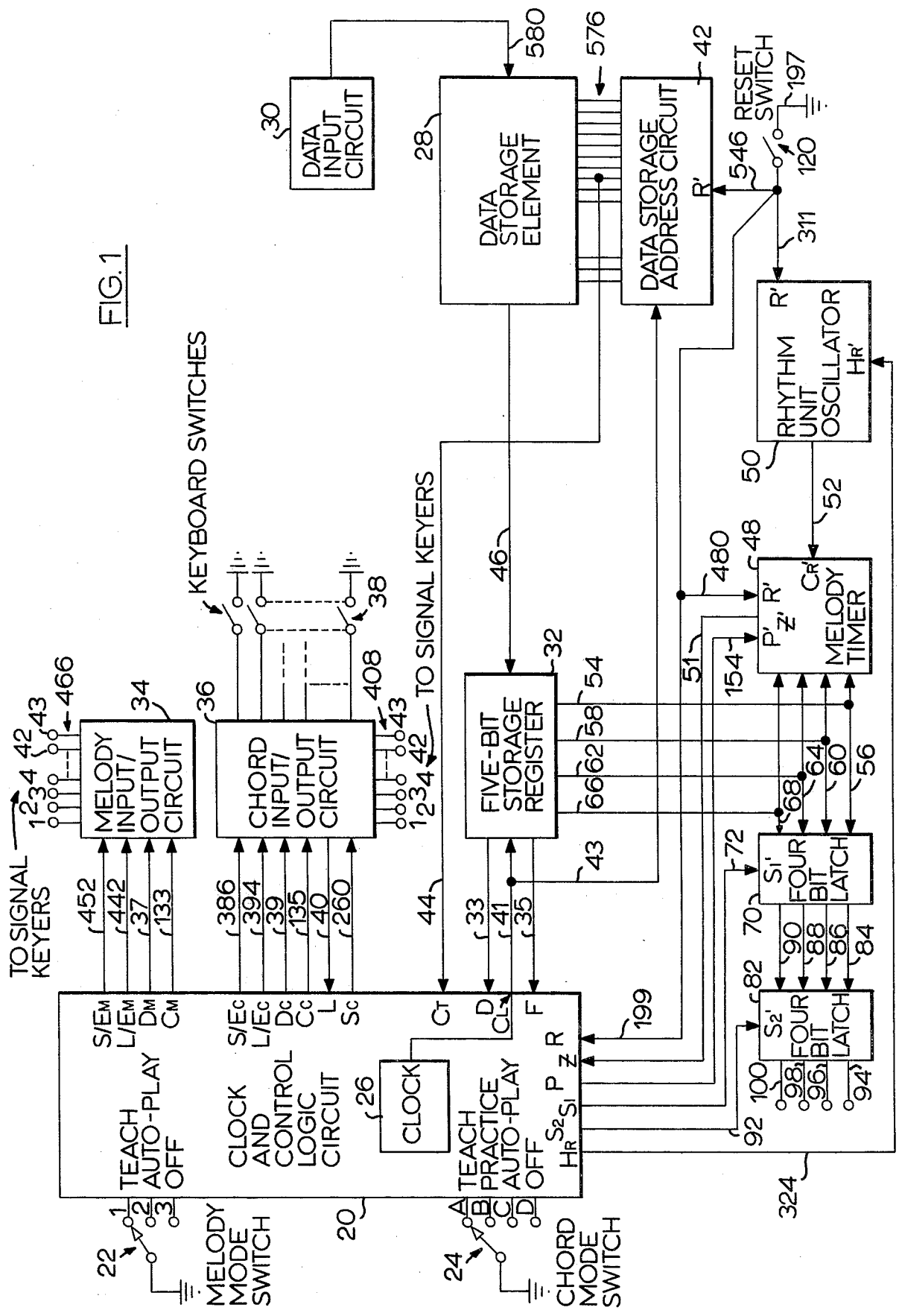
FIG. 1 is a block diagram showing a preferred form of the invention.
Figure 6:
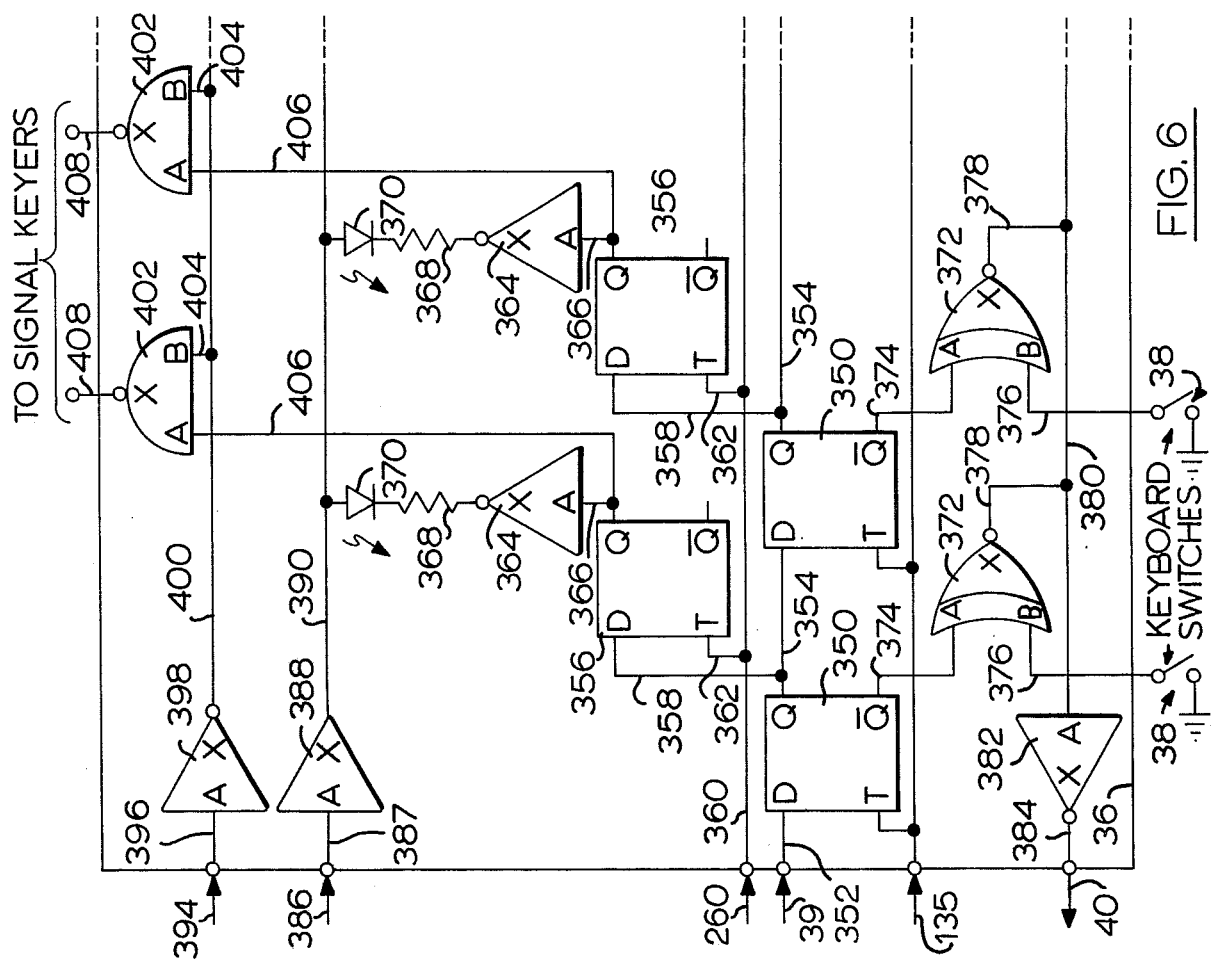
Figure 7:
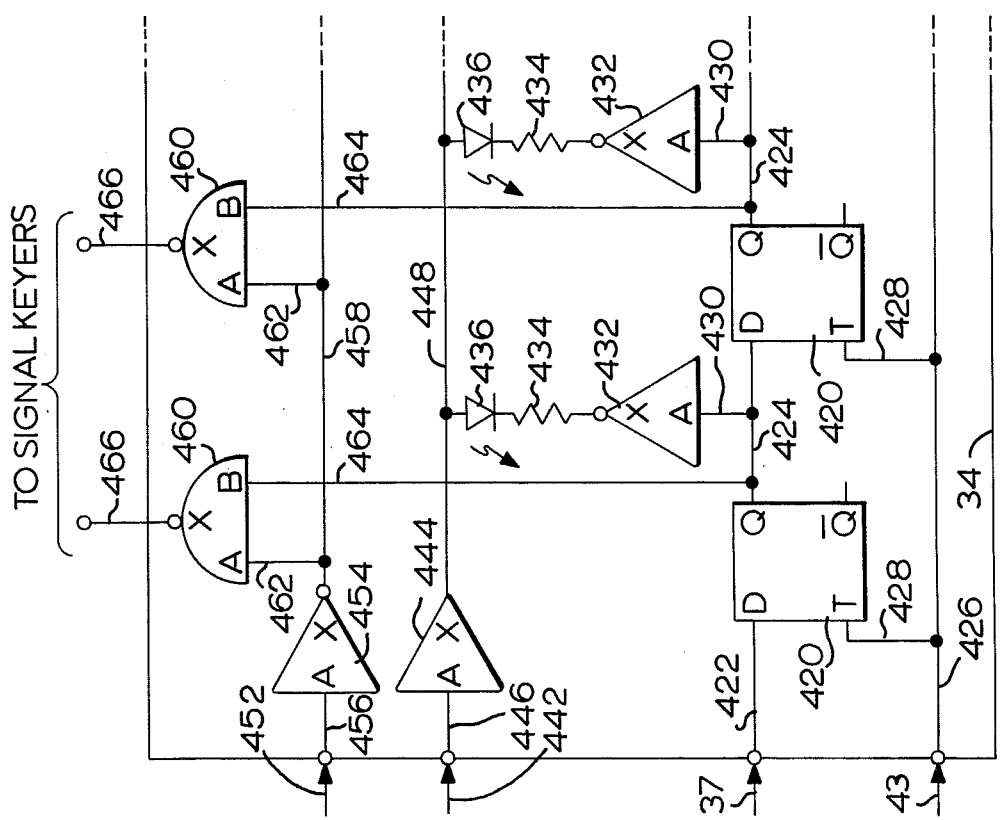
Figure 10A:
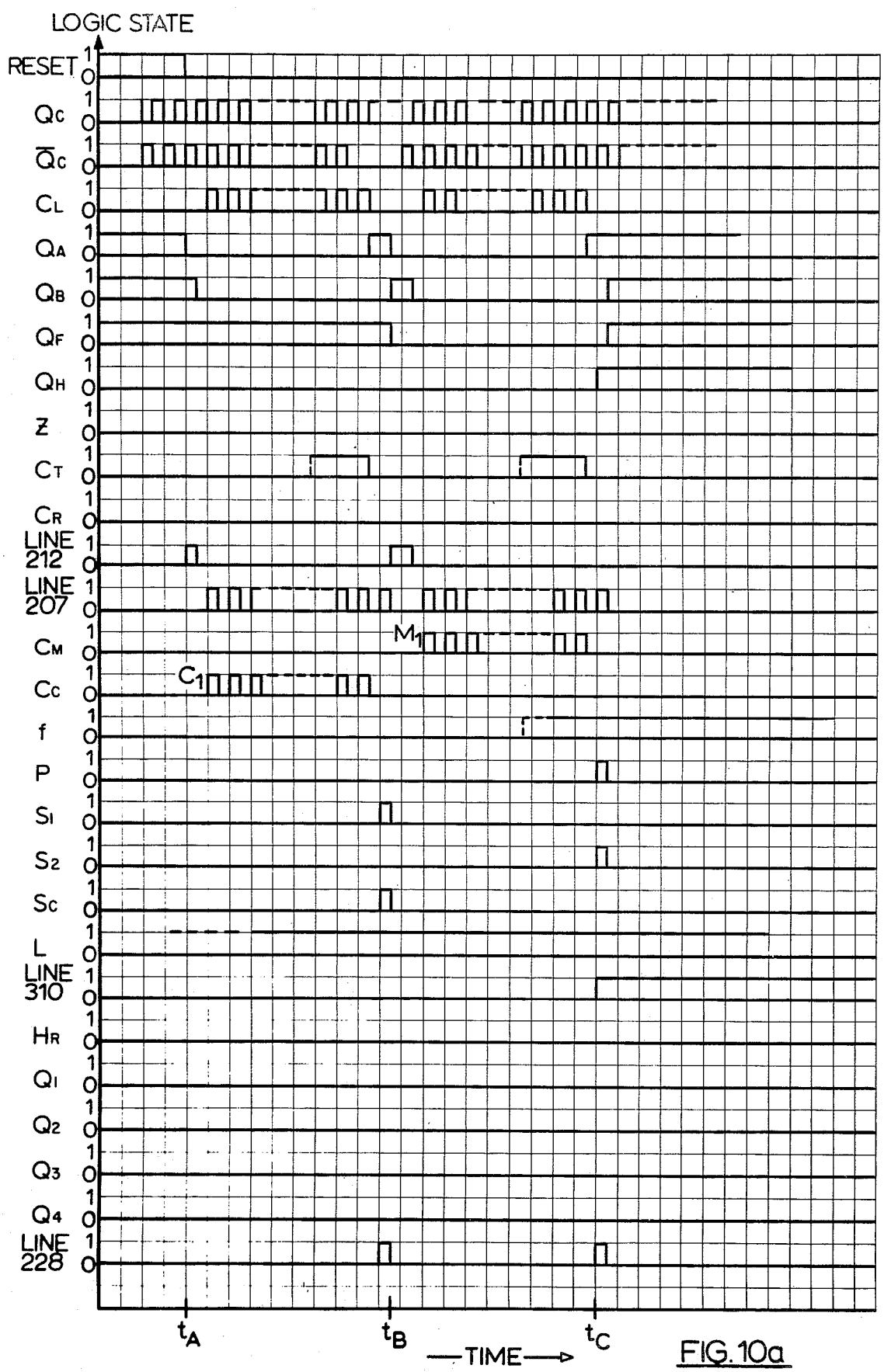
Figure 10B:
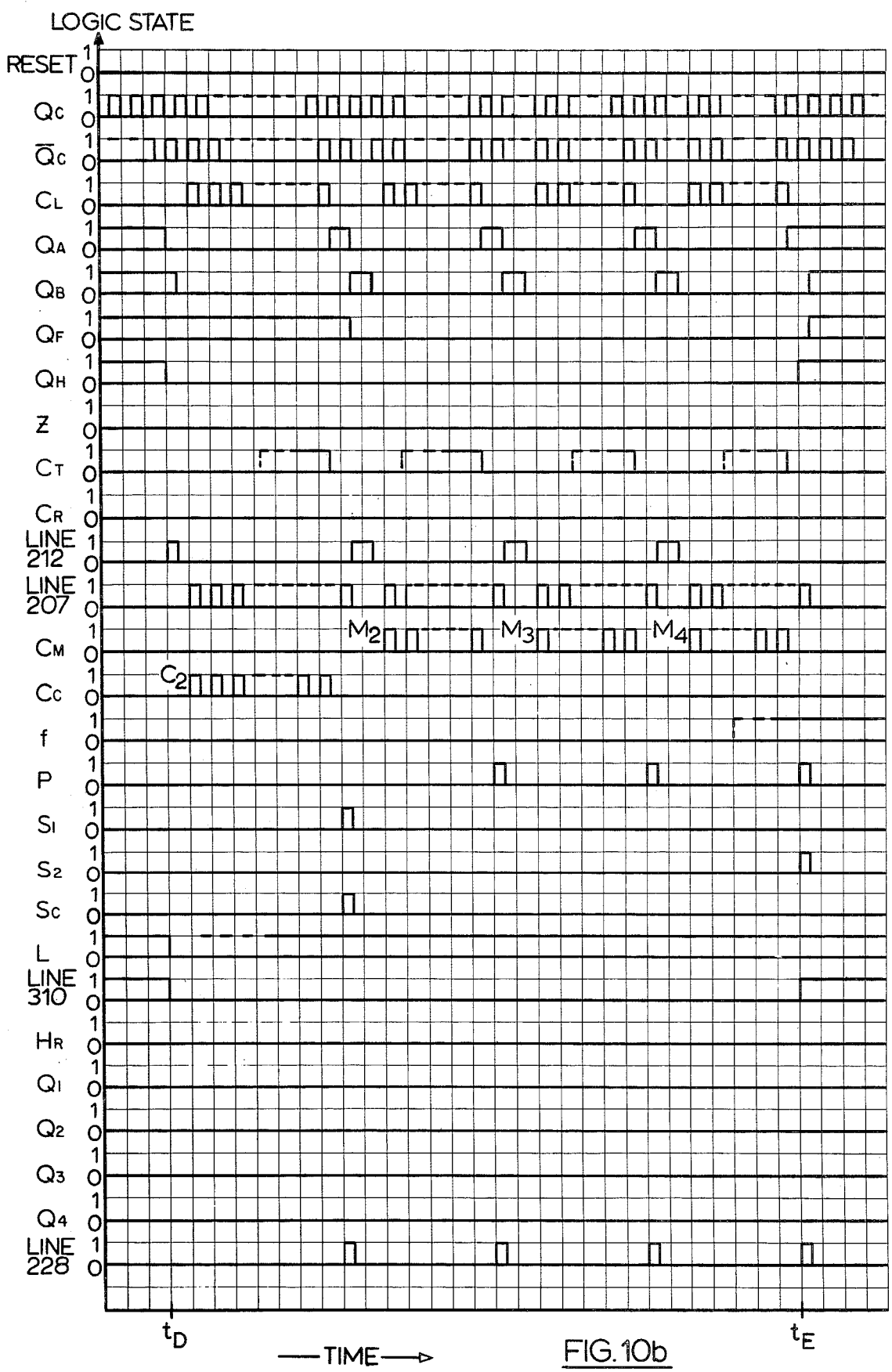

FIGS. 5a–e are timing diagrams showing certain logic waveforms during part of a typical cycle of operation of the embodiment of FIG. 1 in one mode of operation;

FIG. 6 is a block diagram of a melody note input/output circuit;

FIG. 7 is a block diagram of a chord note input/output circuit;

FIG. 8 is a block diagram of a presetable counter;

FIG. 9 is a block diagram of a data storage element and memory address circuit; and FIGS. 10a–b are timing diagrams showing certain of the logic waveforms during part of a typical cycle of operation of the embodiment of FIG. 1 in another mode of operation.

A preferred embodiment of the invention will now be described. This embodiment is intended to be used with an electronic organ, and it may be operated in a number of different modes depending on the setting of two mode switches called the melody mode switch and the chord mode switch. The mode switches function to alter the operation of a control logic circuit which determines in which of the various modes the apparatus is to operate. The mode switches have the following settings:

| Melody Mode Switch: | Chord Mode Switch: |
|---|---|
| 1. Teach | A. Teach |
| 2. Automatic Play | B. Practice |
| 3. Off | C. Automatic Play |
|  | D. Off |

In the following description, the mode switch settings are designated as 1-A, 1-B, 1-C, 1-D, 2-A, 2-B, 2-C, 2-D, 3-A, 3-B, 3-C and 3-D.

MODES OF OPERATION (a) Mode 1-A

Mode 1-A is the normal teaching mode. At the outset of a sequence of operation predetermined lamps are illuminated to denote the particular chord notes and melody notes to be played by the student. The melody notes to be played with a chord are illuminated in a timed sequence at a predetermined rate. Each melody note lamp remains illuminated for a predetermined time corresponding to the timing required for the particular melody note to be played. Timing data is programmed into each melody word in the form of a group of bits located at a predetermined position in the melody word.

The progressive timed illumination of the predetermined melody note lamps and chord note lamps will stop and hold if the student fails to correctly play the chord before the end of the first melody note time requiring a new chord.

Upon simultaneously playing the correct chord notes the chord lamps are extinguished, thereby providing the student with an immediate visual indication that he has played the correct notes. In this manner no pressure is placed on the student since he may take as much time as he needs to find and play the proper chord notes.

After correctly playing a chord the next chord and melody words are read out of the memory and a new group of lamps are illuminated indicating the next melody note and chord to be played.

Data representing the melody and chord notes are stored in the memory in such a way that the lamps which indicate the notes to be played for a subsequent chord are illuminated after the lamp denoting the first melody note of the previous chord has been extinguished. Programming in this way provides the student with advance notice of the next chord so that he may prepare to play the required notes.

(b) Mode 1-B

Mode 1-B is a chord practice mode and is very similar to mode 1-A except the lamps which are illuminated to indicate the notes to be played in order to correctly sound the chord are normally extinguished. The chord indicating lamps will flash on at some time during the period of time in which they were off in Mode 1-A indicating to the student that he has just played the correct notes. The time progression of illuminated melody lamps will hold if the required chord has not been correctly played.

(c) Mode 1-C

In Mode 1-C the chord notes are automatically sounded while the student practices playing the correct melody notes. The lamps denoting the meldoy notes to be played with each chord are illuminated in a timed progression. The chord notes are also illuminated as they are sounded.

(d) Mode 1-D

Operation of the apparatus in Mode 1-D permits the student to play the melody notes in a timed sequence. The chord notes are neither indicated or sounded, however, the bass note code is available to generate a bass note if desired.

(e) Mode 2-A

Mode 2-A is similar in operation to Mode 1-A. In mode 2-A the melody notes are sounded automatically without having to be played by the student and the lamp denoting each note is illuminated as the note is sounded. Operation in this mode allows a student to practice playing the chords for a piece of music while following the melody in normal time.

(f) Mode 2-B

Mode 2-B is similar in operation to Mode 1-B except the melody notes are automatically sounded. The melody lamps are illuminated in normal time as in Mode 1-B. The chord notes are illuminated to indicate to the student that the correct chord notes have been played. In the same manner as in Mode 1-A the progression of illuminated melody lamps will halt if the required chord is not played.

(g) Mode 2-C

In Mode 2-C the piece of music programmed in the memory will be played automatically and the lamps corresponding to notes being sounded will be illuminated. This allows the student to become familiar with the piece of music before attempting to play it.

(h) Mode 2-D

In Mode 2-D the melody notes are automatically sounded and the corresponding melody lamps are illuminated in a timed progression. No chord notes are sounded, nor are the corresponding chord lamps illuminated.

(i) Mode 3-A

In mode 3-A the melody notes are not played or sounded. Mode 3-A is used to practice the chord changes required in a piece of music. The lamps corresponding to the chord notes that are to be played are illuminated and if the chord is correctly played the lamps are extinguished and the next chord is immediately indicated by the keyboard lamps.

(j) Mode 3-B

In Mode 3-B the student practices only the chord notes. When a student has simultaneously played all of the correct chord notes the chord lamps flash on indicated the chord has been correctly played (for proper operation a variable time delay circuit is required - to be described).

(k) Mode 3-C

In Mode 3-C the melody notes are not played or sounded. The chord notes for each chord in the piece of music are automatically played.

(l) Mode 3-D

In Mode 3-D the apparatus is turned off.

All of the aforementioned modes of operation are available to the user once a piece of music has been programmed into the memory. The number of different pieces of music stored in the memory is limited only by the capacity of the memory used.

Referring to the drawings, and in particular to FIG. 1, a control logic circuit 20 (see also FIG. 3) contains the logic circuitry required to operate the apparatus in response to selected settings of a melody mode switch 22 and a chord mode switch 24. A clock 26 provides a source of timing and establishes the basic switching rate for the logic and memory circuits.

The data bits representing melody notes and timing and chord notes and bass accompaniment notes are stored in a data storage element 28. The data bits are stored in the form of data words each comprising 48 data bits. The data is read into the data storage 28 by a data input circuit 30. During operation the data words stored in the data storage element 28 are read out in serial form. Each data word is clocked through a 5-bit storage register 32. All of the data bits in a data word except the last 5 data bits pass unaffected through the 5-bit storage register 32 and are directed via line 33 to a terminal D of the control logic circuit 20. The first of the last 5 data bits in each data word (bit number 44) is retained in the 5-bit storage register 32. This last bit is used as a flag bit to indicate whether the next data word in sequence is a melody word or a chord word. A flag signal is generated from the flag bit by the storage register 32. The flag signal is coupled by a line 35 to terminal F of the control logic circuit 20. If the next data word is a chord word the flag bit has a first characteristic (to be described) and if the next data word is a melody word the flag signal has a second characteristic (to be described).

The remaining 4 data bits in each data word (data bits Nos. 45, 46, 47 and 48) are used to represent melody rhythm timing in the case of a melody word and a bass note code in the case of a chord word. The function of the last 4 data bits in a data word in relation to their presence in a melody word and in a chord word will be described in detail below.

Depending on the characteristic of the flag signal each of the data words on line 33 is directed by the control logic circuit 20 to either the melody input/output circuit 34 (see also FIG. 7) from a terminal $D_m$ of the control logic circuit 20 via line 37 or to the chord input/output circuit 36 (see also FIG. 6) from a terminal $D_c$ of the control logic circuit 20 via line 39.

In Mode 1-A the data bits contained in the chord and melody words entered into the chord input/output 36 and the melody input/output circuit 34 respectively are used to control the illumination of the keyboard lamps (see FIGS. 6 and 7) to denote which keys must be played to sound the required notes. The melody note lamps remain illuminated for a predetermined period of time (to be described) depending on the melody timing for the particular note. After the predetermined time has elapsed the next melody note to be played is indicated by the illumination of the appropriate keyboard lamp.

The chord note lamps remain illuminated until the student correctly plays the chord. The progression of melody lights will stop only if the student fails to play the correct chord before the end of the first melody note time requiring a new chord. In this way the student is not placed under pressure to find and play the next chord.

A series of keyboard switches 38 are coupled to the individual keys of the instrument. When the indicated keys and corresponding keyboard switches 38 are simultaneously operated the chord input/output circuit 36 generates a logic signal which is coupled to a terminal L of the control logic circuit 20 via a line 40. The signal on line 40 initiates an advance cycle (to be described) which results in a new chord word being transferred into the chord input/output circuit 36. Subsequently, a new melody word for the particular bar of music is transferred into the melody input/output circuit 34. As the individual melody notes and chords are correctly played by the student or are sounded automatically the progression of illuminated keyboard lamps continues.

The clock 26 operates at a frequency of approximately 100 kilohertz. However, other frequencies may be used. The clock pulses appear at a terminal $C_L$ of the control logic circuit 20 and are coupled via lines 41 and 43 to a data storage address circuit 42. The address circuit 42 is shown in greater detail in FIG. 9 and will be described more fully below. The individual clock pulses directed to the address circuit 42 are counted. When the 48th clock pulse arrives its presence is used to generate a signal on a line 44 which is directed back to a terminal $C_T$ (see also FIG. 3) of the control logic circuit 20. The signal on line 44 is used to inhibit the clock pulses on line 41 after each group of 48 data bits has been read out of the data storage element 28. Thus, each data word read out of the data storage element 28 comprises 48 bits of data.

The data words are coupled via a line 46 to the 5-bit storage register 32. The first 43 bits of data entering the 5-bit storage register are coupled through the 5-bit storage register and are directed via the line 33 to the data entry terminal D of the control logic circuit 20. Depending on the logic state of the flag bit the 43 data bits are directed via terminal $D_m$ and line 37 to the melody input/output circuit 34 or via terminal $D_c$ and line 39 to the chord input/output 36. The last 5 data bits are held in the 5-bit storage register 32 and are used to generate a flag signal and the rhythm timing in the case of a melody word or a flag signal and the bass note code in the case of a chord word.

After the melody note or notes and the chord notes for a bar of the piece of music stored in the data storage element have been correctly played by the student the control logic circuit 20 advances the system and initiates a new cycle. As a result another series of clock pulses enters the address circuit 42 via lines 41 and 43. Once again after the 48th clock pulse on line 43 an inhibit signal is generated on line 44, thereupon another 48 bit data word is read out of the data storage element 28. The above sequence repeats itself until the entire piece of music has been played.

The time that a lamp indicating a melody note to be played remains on is determined by a presetable counter shown as a melody timer 48. The melody timer 48 is preset by the data contained in the last 4 data bits of each melody word held in data storage register 32.

A rhythm unit oscillator 50 is coupled to the melody timer 48 via a line 52. The frequency of the rhythm unit oscllator output signal is approximately 25 Hz, although other frequencies in the vicinity of 25 Hz, may be used. When enabled (to be described) the rhythm unit oscillator begins to trigger the melody timer 48. The melody timer is a presetable frequency counter. It counts down from the preset count to a zero count at which time a zero count signal is generated. The zero count signal is coupled from a terminal Z' on the melody timer via line 51 to a terminal Z of the control logic circuit 20.

If the next data word in the memory storage element 28 is a melody word the signal at terminal Z initiates a further advance cycle causing the next melody word to be read out of the data storage element 28 and into the melody input/output circuit 34. The appropriate lamps for the particular melody word are illuminated.

If the next data word in the data storage element 28 is a chord word the signal at terminal Z does not initiate a further advance cycle. Rather, the progression of the sequence is inhibited until the student has correctly played all of the chord notes indicated.

Each time a melody word is read out of the data storage element 28 melody timer 48 is preset to a count which is related to the melody note timing. The countdown sequence commences when the rhythm until oscllator 50 is enabled. The melody timer is preset to a specific count between 1 and 16 by the last four data bits in each melody word. The last four data bits are stored in the storage register 32 and are coupled to the melody timer via lines 54/56, 58/60, 62/64 and 66/68.

In the case of a chord word the last four data bits represent a bass note code. The bass note code can be decoded into 1 of 16 outputs by appropriate external circuitry (not shown). The decoded output may be used to provide automatic bass note accompaniment. The decoding circuitry will be familiar to those skilled in the art and need not be described. As described above, in respect of the melody timing data, the bass note code data is held in the 5-bit storage register 32 and is available on lines 54, 58, 62, and 66.

When a chord word is read from the data storage element 28 latching signals available at terminals $S_1$ and $S_2$ of the control logic circuit 20 are generated (in a manner to be described). The latching signal at the terminal $S_1$ is coupled to a 4-bit latch 70 via line 72. The latch signal on line 72 transfers the data on lines 54/56, 58/60, 62/64 and 66/68 into the 4-bit latch 70 where the data is temporarily stored. Later, this data is transferred into a second 4-bit latch 82 via lines 84, 86 88 and 90. The data transfer into 4-bit latch 82 is initiated by a strobe signal available at terminal $S_2$ of logic control circuit 20. The strobe signal at the terminal $S_2$ is coupled to the latch 82 via line 92. The data representing the bass note code is now available on output lines 94, 96, 98 and 100.

The data on the lines 94, 96, 98 and 100 may be decoded into one of sixteen output lines. The decoded signal can then be used to automatically sound notes (to be described) in order to provide bass note accompaniment.

Reference is now made to FIG. 2 which shows a line of music 110. The melody notes are designated by symbols $M_1$, $M_2$, etc. and the chord notes by the symbols $C_1$, $C_2$, etc. The sequence in which the notes are programmed in the data storage element 28 is written as follows: $C_1$, $M_1$, $C_2$, $M_2$, $M_3$, $M_4$, $C_3$, $M_5$, $M_6$, $C_4$, $M_7$, $M_8$, $M_9$. . .

The first, third, seventh and tenth data words will be chord words and the second, fourth, fifth, sixth, eighth, ninth, eleventh, twelfth, and thirteenth data words will be melody words.

Figure 3:
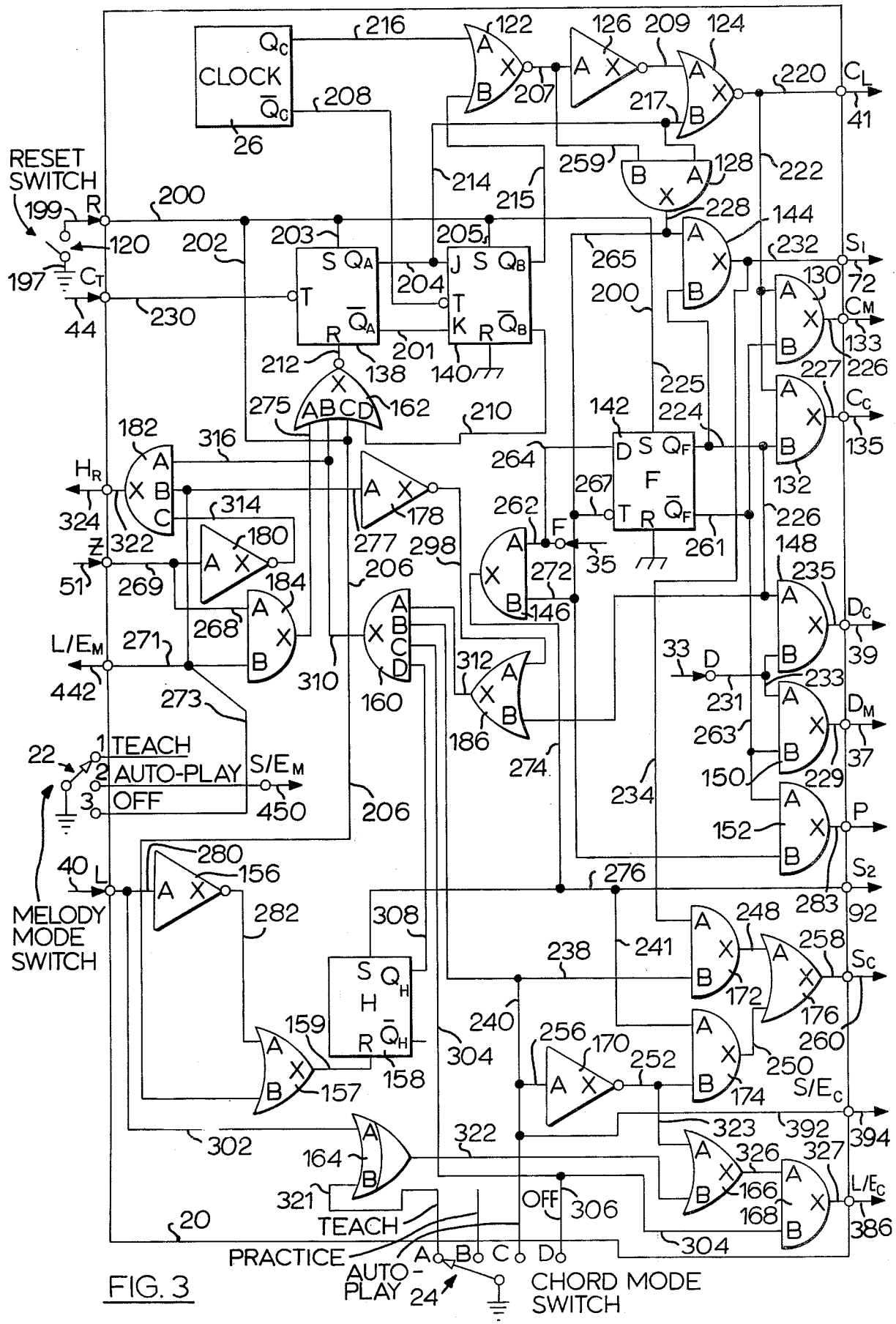
FIG. 3 is a block diagram of a control logic circuit.

Reference is next made to FIG. 3 to describe the general operation of the control logic circuit 20. To initiate operation of the system the student first operates a reset switch 120 (see also FIG. 1). The reset switch 120 is a fast acting electrically debounced switch which when opened with respect to ground establishes the necessary initial conditions for the logic elements included in the logic control circuit 20 as well as the data storage address circuit 42, the melody timer 48 and the rhythm unit oscillator 50. When the reset switch 120 is closed to ground the system starts (to be described).

The logic control circuit 20 is comprised of standard logic elements including OR gates, NOR gates, AND gates, NAND gates, INVERTERS, FLIP-FLOPS and an EXCLUSIVE OR gate. The various logic elements are connected in a manner to be described and are operated under the control of the clock 26.

Prior to a detailed description the individual logic elements and the logic conditions prevailing within the control logic circuit 20 at various points in time during a cycle of operation a brief description of the individual logic elements in the logic control circuit 20 will be provided.

The clock pulses generated by the clock 26 are directed by NOR gates 122, 124, an INVERTER 126 and an AND gate 128 either to the data storage address circuit 42 via the terminal $C_L$ and the lines 41 and 43 (see also FIG. 1) or to one or other of the melody input/output circuit 34 via an AND gate 130 or the chord input/output circuit 36 via an AND gate 132. AND gates 130 and 132 when enabled, direct the clock pulses available at the output terminal X of the NOR gate 124 along one or other of lines 133, 135 to the melody or chord input/output circuits 34, 36 respectively.

The line 44 from the address circuit 42 is coupled to the terminal $C_T$ of the control logic element 20 and is used to trigger a FLIP-FLOP 138. The FLIP-FLOP 138 and a FLIP-FLOP 140 serve to enable or disable the logic gates 122, 124 and 128. Depending on the prevailing logic conditions in the control logic circuit 20, as determined by the flag signal characteristic, the clock pulses will appear either at terminal $C_L$ and at terminal $C_m$ or at terminal $C_L$ and at terminal $C_c$.

A FLIP-FLOP 142 is operated by the signal from the AND gate 128. The signal from the AND gate 128 reads the flag signal logic state at terminal F into FLIP-FLOP 142 via terminal T. This in turn causes a change in the state of the output terminals $Q_F$ and $\overline{Q}_F$. The output signals at terminals $Q_F$, $\overline{Q}_F$ of the FLIP-FLOP 142 are employed to enable or disable the AND gates 130, 132 so that the clock pulses from NOR gate 124 are directed to either line 133 via the AND gate 130 or line 135 via the AND gate 132.

The FLIP-FLOP 142 is also used to generate a strobe signal on the line 72 (see also FIG. 1). The strobe signal is generated by an AND gate 144 and appears at the terminal $S_1$ of the control logic element 20. An AND gate 146 is enabled by a signal from AND gate 128 and generates a strobe pulse at the terminal $S_2$. Terminal $S_2$ is coupled to 4-bit latch 82 via line 92.

The data stored in the memory element 28 is coupled to terminal D of the control logic circuit 20 via the 5-bit storage register 32 and lines 46 and 33. As previously indicated, depending on the prevailing logic conditions the data on line 33 is directed either to the data input of the melody input/output circuit 34 via line 37 or to the data input of the chord input/output circuit 36 via line 39.

AND gates 148, 150 are enabled or disabled as the case may be by the FLIP-FLOP 142 thereby coupling the data at the terminal D to either line 37 or line 39. The data word is transferred into either the melody or chord input/output circuit 34 and 36 respectively depending on whether the data word is a melody word or a chord word.

A preset pulse is generated by an AND gate 152 when enabled by the FLIP-FLOP 142. The preset pulse is coupled to a terminal P on the control logic circuit 20. The preset pulse is coupled to the melody timer 48 via a line 154 (see also FIG. 1). The purpose of the preset pulse is to enter the data on lines 56/56, 58/60, 62/64 and 66/68 into the melody timer 48 in order to preset the melody timer to an initial count.

The signal at the terminal L of the control logic circuit 20 is generated by the chord input/output circuit 36. The signal at terminal L is coupled via an INVERTER 156 and an OR gate 157 to the R input terminal of a FLIP-FLOP 158. The output from the FLIP-FLOP 158 is coupled via an AND gate 160 and a NOR gate 162 into a terminal R of the FLIP-FLOP 138. The signal at terminal R of the FLIP-FLOP 138 is used to trigger the FLIP-FLOP thereby initiating an advance cycle once the student has played the correct chord notes.

An ENOR gate 164, an OR gate 166 and an AND gate 168 are used to generate a lamp-enable signal at a terminal $L/E_c$ of the control logic circuit 20. This signal is used to extinguish the lamps illuminated by the chord input/output circuit 36 to denote the chord that is to be played by the student.

An INVERTER 170, AND gates 172, 174 and an OR gate 176 are used to generate a chord strobe signal at a terminal $S_c$ of the control logic circuit 20. The chord strobe signal is employed to strobe or transfer the data entered into the chord input/output circuit 36 into a latch circuit (to be described). The latch circuit holds the data for a short period of time.

The inter-connection and function of the remaining logic elements including INVERTERS 178, 180, AND gates 182, 184 and an OR gate 186 and the melody and chord mode switches 22 and 24 respectively will be described below in the detailed description of the logic control circuit 20.

Reference is next made to FIG. 4 which shows the various types of logic elements used in the preferred embodiment of the present invention. Each logic element is shown with its associated truth table. The truth table defines the output logic state of each logic element for various input logic conditions. The truth tables are expressed in terms of binary logic notation. Binary logic notation is a system in which all values have only two possible states, true or false, 1 or 0, high or low, etc. In the description to follow the logic convention shown in FIG. 4 will be adhered to. To simplify the description of the logic circuitry a shorthand notation will be employed in which the input or output terminals of a logic element will be said to equal or be in a logical state or condition of 1 or 0. For example, in FIG. 4, the truth table for the FLIP-FLOP can be expressed as follows: If $R = 1$ and $S = 0$, then $Q = 0$ and $\overline{Q} = 1$.

General reference will be made to FIG. 4 from time to time in order to assist in the description of the logic states associated with a particular logic element.

FIG. 5, parts A through E inclusive, is a timing diagram showing the waveforms existing at various locations in the logic circuitry shown in FIG. 3. In order to make the description associated with each of FIGS. 3, 6, 7, 8 and 9 more readily understandable each of the descriptions should be considered along with the waveforms shown in FIG. 5. In addition, where necessary for clarity specific reference will be made to a particular waveform occuring at a particular time.

Reference 5A) the now made to FIGS. 3, 4 and 5 in order to describe control logic circuit 20 in detail. At a time $t_1$ (see FIG. 5A) the reset switch 120 is closed. The reset switch 120 is connected to electrical ground via a line 197 and to the control logic circuit 20 via a line 199 and a terminal R. Electrical ground is considered to be the lowest potential level in the system and represents a logical 0 condition. As a result of the reset switch 120 being closed to ground the lines 200, 202, 203, 205 and 206 and the input terminal S of the FLIP-FLOPS 138, 140 and 142 are at logical 0. The R terminal of the FLIP-FLOPS 140 and 142, being grounded are at logical 0.

At a time $t_1$ all of the input terminals A, B, C and D of NOR gate 162 are at logical 0 (to be described below). The signal at output terminal X of NOR gate 162, on a line 212, and at terminal R FLIP-FLOP 138 is in a logical 1 condition (refer also to FIG. 4 - NOR gate). As a result at the time $t_1$ the output terminals $Q_B$, and $Q_F$ are in a logical 1 condition and the output terminal $Q_A$ is in a logical 0 condition.

A terminal S of FLIP-FLOP 158 is connected to the output terminal X of AND gate 146. The output terminal X of AND gate 146 is normally at logical 0 because most data words carry a logical 0 flag bit resulting in a logical 0 signal at input terminal A of AND gate 146 (refer also to FIG. 4 - AND gate). The logic state of terminal F will be described in greater detail below. The reset switch 120 is coupled to the R input terminal of FLIP-FLOP 158 via lines 199, 200, 202 and 206, the OR gate 157 and the line 159. Consequently, at the time $t_1$ the R terminal of FLIP-FLOP 158 changes from a logical 1 to a logical 0 state. The truth table for a FLIP-FLOP (see FIG. 4 - FLIP-FLOP) indicates that $Q = 0, \overline{Q} = 1$ when the condition $R = 1, S = 0$ exists. When R is subsequently switched to a logical 0 neither Q or $\overline{Q}$ change in logic state. As a result, at the time $t_1$, $Q_H = 0$ and $\overline{Q}_H = 1$.

In addition, other circuit conditions (to be described in greater detail below) prevail which result in terminals Z and $C_T$ of control logic circuit 20 and a terminal $C_R$ of the melody timer 48 being at logical 0 at the time $t_1$.

The clock pulses generated by the clock 26 at terminal $\overline{Q}_c$ are coupled to terminal T of FLIP-FLOP 140 via a line 208. At a time $t_2$ (see FIG. 5A-$\overline{Q}_c$) the first clock pulse generated after operating the reset switch 120 appears at terminal T of FLIP-FLOP 140. The J and K input terminals of FLIP-FLOP 140 are coupled to output terminal $Q_A$ and $\overline{Q}_A$ via lines 204 and 201 respectively. As a result, the first clock pulse on line 208 causes the signal at the output terminals $Q_B$ and $\overline{Q}_B$ to change logic state so that $Q_B = 0$ and $\overline{Q}_B = 1$ (see FIG. 4 - FLIP-FLOP). A logical 1 condition now exists on line 210 and at the input terminal D of NOR gate 162. This logic condition causes the output terminal X of NOR gate 162, line 212 and terminal R of FLIP-FLOP 138 to switch in state to logical 0 (see FIG. 4—4 input NOR gate).

Lines 214, 215 and 217 are now at logical 0 thereby enabling both NOR gates 122 and 124 and disabling AND gate 128.

Under these conditions the clock pulses at the terminal $Q_c$ and on a line 216 are coupled via NOR gate 122, line 207, INVERTER 126, line 209 and NOR gate 124 to lines 220 and 222. The clock pulses on line 220 are coupled via the terminal $C_L$ and lines 41 and 43 to the data storage address circuit 42. The clock pulses on line 41 are also coupled to the 5-bit storage register 32 (see FIG. 1). The operation of the data storage address circuit 42 and the 5-bit storage register 32 will be described in detail below.

As described above at the time $t_1$ $Q_F = 1$, consequently, the signal on lines 224, 225 and 226 is at logical 1. The AND gates 132, 144 and 148 and the OR gate 186 are enabled. The clock pulses on line 222 are now coupled through the AND gate 132 and appear at terminal $C_c$ via line 227. The clock pulses are coupled from terminal $C_c$ to the chord input/output circuit 36 via line 135.

Data from the data storage element 28 is directed via line 46, the 5-bit storge register 32 and line 33 to input terminal D of the control logic circuit 20. Since AND gate 148 is enabled at the time $t_1$ the data signal is coupled into the input terminal B of AND gate 148 via lines 231, 233 and appears at the output terminal X of AND gate 148 on a line 235. The data signal on line 235 and at the terminal $D_c$ is coupled to the chord input/output circuit 36 via line 39 (see also FIG. 1). The operation of the chord input/output 36 will be described in further detail below with reference to FIG. 6.

The signal on line 44 changes from a logical 1 state to a logical 0 state immediately subsequent to each successive block of 48 clock pulses counted by the memory address circuit 42 (see FIG. 5). The line 44 is coupled to terminal $C_T$ via line 230 to an input terminal T of the FLIP-FLOP 138.

At a time $t_3$, immediately after the 48th clock pulse on line 41, (see FIG. 5A) the signal on line 44 changes from a logical 1 to a logical 0 state triggering FLIP-FLOP 138 and causing $Q_A$ to revert back to a logical 1 state. The AND gate 128 is thereby enabled and the NOR gate 124 is disabled. As a result no further clock pulses appear on line 220. However, the very next clock pulse on line 216 is coupled through NOR gate 122 (still enabled since $Q_B = 0$) and AND gate 128 (still enabled since $Q_A = 1$) to line 228.

At the time $t_3$ $Q_A = 1$ and $Q_B = 0$. The next clock pulse on line 208 triggers the FLIP-FLOP 140 causing it to change states so that $Q_B = 1$ and $\overline{Q}_B = 0$. The output terminal X or NOR gate 162 switches back to a logical 1 state which in turn causes the FLIP-FLOP 138 to again change state so that $Q_A = 0$. The next clock pulse on line 208 causes the FLIP-FLOP 140 to change logic state again so that $Q_B = 0$ and $\overline{Q}_B = 1$. As a result of this switching sequence the AND gate 128 is enabled for one-half of a clock pulse period. Consequently, each time the logic state at the terminal $C_T$ switches from logical 1 to logical 0 a signal appears at the terminal X of AND gate 128. The signal comprises a single pulse having a width equal to one-half a clock pulse period (see FIG. 5).

The terminal $Q_F$ remains in a logical 1 state and thus the AND gate 144 remains enabled and couples the signal on line 228 onto lines 232 and 234. The signal on line 232 is available at the terminal $S_1$ and is coupled via line 72 to the 4-bit latch 70 (to be described).

The signal on line 234 is coupled to input terminal A of the AND gate 172. The B input terminal of AND gate 172 is coupled to a contact C of the chord mode switch 24 via lines 238 and 240.

In mode 1-A contact C of switch 24 is at logical 1. As a result AND gate 172 is enabled and allows the signal on line 234 to be coupled onto line 248 and an input terminal A of OR gate 176. Input terminal B of OR gate 176 is coupled to the ouptut terminal X of AND gate 174 via line 250. The input terminal B of the AND gate 174 is coupled via line 252, INVERTER 170 and lines 256, 240 to contact C of the chord mode switch 24. Consequently, irrespective of the logic state of the signal on a line 241, which connects line 276 to the input terminal A of AND gate 174, the output terminal X of AND gate 174 and line 250 are at logical 0.

A logical 0 signal at the terminal B of OR gate 176 enables the gate (see FIG. 4 - 2 input OR gate) coupling the signal on line 248 to line 258 and the terminal $S_c$. The terminal $S_c$ is connected via line 260 to the chord input/output circuit 36. The signal on line 260 causes a data transfer within the chord input/out circuit 36 (to be described).

As indicated above the fifth last data bit in each chord word is used a flag bit to indicate whether the next data word being read out of the data storage element 28 is a chord word or a melody word. The generation of a flag signal by the 5-bit storage register 32 will be described in more detail below.

The flag signal is coupled from the 5-bit storage register 32 via line 35 to the terminal F of the control logic circuit 20 and then via line 262 to the input terminal A of the AND gate 146 and via lines 262 and 264 to the input terminal D of the FLIP-FLOP 142.

At a time $t_4$ the flag signal is at logical 0 since the next data word is the melody word $M_1$. The flag signal on line 264 is entered into the FLIP-FLOP 142 by the negative going trailing edge of the signal on line 228. The signal on line 228 is coupled to terminal T of the FLIP-FLOP 142 via lines 265 and 267.

When the flag signal is read into FLIP-FLOP 142 the output terminal $Q_F$ and $\overline{Q}_F$ change in logic state so that $Q_F = 0$ and $\overline{Q}_F = 1$. At the time $t_3$ $Q_A = 1$ and $\overline{Q}_A = 0$, therefore the terminal J of FLIP-FLOP 140 is at logical 1 and terminal K is at logical 0. As a result, at the time $t_4$ the negative edge of the clock pulse on line 208 triggers FLIP-FLOP 140 causing $Q_B$ to change in state to logical 1. In response, the output terminal X of the OR gate 162 returns to a logical 1 condition causing output terminal $Q_A$ of FLIP-FLOP 138 to switch to logical 0. The next clock pulse causes the FLIP-FLOP 140 to change state one clock pulse period after $t_4$ so that $Q_B = 0$ and $\overline{Q}_B = 1$. (See FIG. 5A — at time $t_4$).

When $Q_A = Q_B = 0$ a new advance cycle is initiated. Clock pulses appear at the terminal $C_L$ and on line 41. In response to the clock pulses on lines 41, 43 the next data data word is read out of the data storage element 28. In this case the melody word $M_1$ is read out of the data storage element 28. The melody word $M_1$ contains a flag bit having a logical 1 state since the next data word is the chord word $C_2$. At the time $t_4$ the terminal $\overline{Q}_F$ and lines 261, 263 are in a logical 1 state. The AND gates 130, 150 and 152 are enabled while AND gates 132, 144, 148 and 172 are disabled. Since $Q_A = Q_B = 0$ NOR gates 122 and 124 are enabled and clock pulses appear on line 222. The clock pulses enter the input terminal A of AND gate 130 and are coupled via lines 266 and 133 to the melody input/output circuit 34.

At a time $t_5$, subsequent to the next group of 48 clock pulses being counted by the memory address circuit 42, the logic level on line 44 again switches to logical 0. The signal on lines 44, 230 triggers FLIP-FLOP 138 causing $Q_A$ to change state to logical 1. The NOR gate 124 is disabled and the AND gate 128 enabled. Consequently, the next clock pulse appearing at the X terminal of the NOR gate 122 is coupled to a line 228 via lines 207, 259 and the AND gate 128.

The next data word being held in data storage 28 is the chord word $C_2$ (see FIG. 2). As a result, the melody word representing the note $M_1$ has a logical 1 in the flag bit position so that terminal F of logic circuit 20 is at logical 1. A logical 1 state at terminal A of AND gate 146 enables this gate. Consequently, the pulse on line 265 (see FIG. 5A - line 228) is coupled to terminal B of the AND gate 146 via line 272. The pulse appears at output terminal X of AND gate 146 and on lines 274, 276. The signal on line 276 is directed to the terminal $S_2$ of control logic circuit 20 and then via line 92 to a 4-bit latch 82 (to be described). The pulse is used to initiate the transfer of data on lines 84, 86, 88 and 90 into the 4-bit latch 82.

The signal on line 274 is also coupled to the S terminal of the FLIP-FLOP 158 via line 276. The appearance of a logical 1 signal at this terminal causes the FLIP-FLOP 158 to change state so that $Q_H = 1$ and $\overline{Q}_H = 0$.

At this juncture it is assumed that the student has not yet played the correct chord keys for the chord $C_1$. Consequently, terminal L of control logic circuit 20 is in a logical 1 state. Terminal L is connected by a line 40 to the chord input/output circuit 36 and switches to a logical 0 state only after the student has correctly played the chord keys (at a time $t_7$ -to be described) indicated by the illuminated lamps on the instrument keyboard. The signal at terminal L is directed via a line 280, INVERTER 156, the line 282, the OR gate 157 to the R input terminal of the FLIP-FLOP 158.

The signal generated on line 228 at the time $t_5$ is coupled through AND gate 152, enabled since $\overline{Q}_F = 1$, and is connected via line 283, a terminal P and line 154 to a terminal P' on the melody timer 48. The purpose of this signal will be described below in connection with FIG. 8. For the moment it is sufficient to state that the signal on line 154 is used to transfer data stored in the 5-bit storage register 32 and available on lines 54/56, 58/60, 62/64 and 66/68 into the melody timer 48. The data is used to preset a count number into the melody timer. At the same time the logic level at the terminal Z' of the melody timer is changed from logical 0 to logical 1 (see FIG. 5A - Z' at time $t_5$).

The terminal A of the AND gate 184 is connected via lines 268, 269, to terminal Z. The terminal B of the AND gate 184 is connected via lines 271, 273 to a contact 3 of the melody mode switch 22. Consequently, terminals A and B and X of AND gate 184 are at logical 1. (see FIG. 4-2 input AND gate). The logical 1 state on line 275 and at terminal A of NOR gate 162 results in a logical 0 level on line 212 (see FIG. 4—4 input NOR gate). The output terminal $Q_A$ remains at logical 1 and NOR gate 124 and AND gate 128 remain inhibited thereby preventing the appearance of clock pulses on either of the lines 220 and 222.

At the time $t_5$ plus one-half clock pulse period, the logical 1 flag signal at the terminal D of FLIP-FLOP 142 is entered into the FLIP-FLOP 142 by the pulse signal on line 228 (see FIG. 5A - line 228 at time $t_5$) causing terminal $Q_F$ to switch from a logical 0 to logical 1 state. Thus, terminal B of the OR gate 186 is at logical 1. Terminal A of INVERTER 178 is at logical 1 and therefore terminal X of INVERTER 178 and terminal A of OR gate 186, connected via line 298 to INVERTER 178, are both at logical 0. Consequently, line 312 which connects terminal X of OR gate 186 to terminal A of the AND gate 160 is at logical 1. Terminals B and C of AND gate 160 are connected via lines 238 and 240 to a contact C of the chord mode switch 24 and via lines 304 and 306 to a terminal D on switch 24 respectively. Both terminals C and D on switch 24 are at logical 1. Terminal D of AND gate 160 is connected via line 308 to output terminal $Q_H$ of FLIP-FLOP 158. At the time $t_5$ plus one-half clock pulse period, $Q_H = 1$. Since all of the input terminals of the AND gate 160 are logical 1 the output terminal X is also at logical 1. As a result the line 310 and terminal B of NOR gate 162 are at logical 1 and a further advance cycle is inhibited.

When the reset switch 120 was operated at the time $t_1$ the reset signal was coupled to a terminal R' of the rhythm unit oscillator 50 via line 311 (see also FIG. 1). The signal on line 311 is used to enable the rhythm unit oscillator 50 which then commences to generate clock pulses. The rhythm unit oscillator clock pulses are coupled via line 52 to the melody timer 48. The melody timer 48 begins to count down from the preset count, described above, to a zero count.

The time taken to count down to the zero count depends on the initial preset count. For example, if the melody timer is set to a count of 4 it will reach zero count after 4 rhythm unit oscillator clock pulses each corresponding to a sixteenth note. The melody timer 48 will be described in further detail in connection with FIG. 8.

At a time $t_6$ (see FIG. 5B) the melody timer 48 reaches a zero count and the signal at a terminal Z' of the melody timer, on line 51 and at terminal Z of the control logic circuit 20 is at logical 0. Terminal Z is coupled to a terminal A of the INVERTER 180 via line 269. The output terminal X of the INVERTER 180 is coupled to a terminal C of the AND gate 182 via line 314. Terminals A and B of the AND gate 182 are connected respectively to output terminal X of AND gate 160 via lines 310, 316 and via lines 273, 277 to contact 3 of the melody mode switch 22. Consequently, all three input terminals A, B and C of the AND gate 182 are in a logical 1 condition resulting in a logical 1 condition at the output terminal X of AND gate 182. A terminal $H_R$ is coupled to AND gate 182 via line 322 is also at logical 1. Terminal $H_R$ is coupled to a terminal $H_R'$ of the rhythm unit oscillator 50 via line 324.

When the signal on line 324 is at logical 1 it inhibits the rhythm unit oscillator 50 thereby preventing the appearance of further clock pulses on line 52. The inhibiting action is terminated after the student has played the correct chord keys. At this juncture, time $t_7$, the signal at the terminal L resets the FLIP-FLOP 158 so that $Q_H = 0$. Thus, the input terminal D of the AND gate 160 is at logical 0, causing the output terminal X of AND gate 160 to switch to logical 0. As a result, the signal at terminal $H_R$ also switches to logical 0 (see FIG. 5B-$H_R$ at time $t_7$ and line 310 at time $t_7$).

At a time $t_7$ the student plays the correct chord notes and as a result the logic level on line 40 hence at terminal L switches state to logical 0 to be described in connection with FIG. 6. The output terminal X of INVERTER 156 is now at logical 1. This in turn resets the FLIP-FLOP 158 through OR gate 157 so that $Q_H = 0$ and $\overline{Q}_H = 1$ and as a result terminal D of the AND gate 160 returns to a logical 0 state. Output terminal X of the AND gate 160 also reverts to logical 0. The output terminal X of the AND gate 182 responds by switching to logical 0. Since terminal $H_R$ is now at logical 0 the rhythm unit oscillator 50 is enabled and clock pulses from the rhythm unit oscillator appear on line 52.

Once again all of the inputs of the NOR gate 162 are at logical 0 so that the output terminal X of NOR gate 162 is at logical 1 thereby causing FLIP-FLOP 138 to change state so that terminal $Q_A = 0$ and terminal $\overline{Q}_A = 1$. The FLIP-FLOP 140 is triggered by the next clock pulse on line 208 so that $Q_B = 0$ and $\overline{Q}_B = 1$. This initiates another advance cycle and causes the output terminal X of NOR gate 162 to switch to logical 0.

Chord $C_2$ is now read out of data storage element 28 into the chord input/output circuit 36 in the same manner as described above with respect to the chord $C_1$.

At a time $t_8$ terminal Z of the control logic circuit 20 is at logical 0 since chord word $C_2$ has just been read out of data storage element 28. As a result line 51 is at logical 0 and the appearance of a signal at terminal $C_T$ initiates a further advance cycle.

Melody word $M_2$ is read into the melody input/output circuit 34. In addition, data on lines 54, 58, 62 and 68 is coupled into the melody timer 48 via lines 56, 60, 64 and 68 respectively. The data is read into the melody timer by a signal at terminal P of control logic circuit 20 thereby presetting melody timer 48 (see FIG. 5C P between times $t_8$ and $t_9$. Since the new melody word $M_2$ is a half note (see FIG. 2) the melody timer is preset to a count of 8. Thus, a new chord and melody note are indicated by lamps illuminated above the keyboard. The melody timer 48 counts down to zero (refer to FIG. 5C - $C_R$).

At a time $t_9$ the melody timer 48 reaches a zero count and terminal Z switches to a logical 0 condition. The output terminal X of NOR gate 162 again reverts to logical 1 and $Q_A = 0$. Under these conditions another advance cycle is initiated.

Because the flag bit is at logical 0 $\overline{Q}_F = 1$ thereby enabling AND gate 150 and coupling the data signal at terminal D to terminal $D_m$ via lines 231, 233 and AND gate 150 and line 229. The data is coupled via line 37 to melody input/output circuit 34. Once again the melody timer is preset, this time to a count of 4 since the note $M_3$ is a quarter note.

At a time $t_{10}$ the melody note timer 48 once again reaches a zero count causing the terminal Z of the control logic circuit 20 to switch to logical 0 thereby initiating still another advance cycle. The data for melody note $M_4$, a three-quarter note, is read into the melody input/output circuit 34 (see FIG. 5D–$C_m$ at time $t_{10}$). The melody timer is again preset this time to a count of 12. The flag bit in melody note $M_4$ is at logical 1 since the next data word is the chord word $C_3$. As a result at a time $t_{11}$ the signal on line 228 (see FIG. 5D–line 228) enables AND gate 146 causing the logical 1 condition on line 265 to appear on lines 274, 276 thereby setting FLIP-FLOP 158 so that $Q_H = 1$. As a result, terminal X of AND gate 160 and terminal B of NOR gate 162 are at logical 1 thereby inhibiting a further advance cycle.

At the time $t_{11}$ the melody word $M_4$ and chord word $C_3$ have been read into the melody input/output circuit 34 and the chord input/output circuit 36 respectively, causing the appropriate keyboard lamps to be illuminated. If the student fails to correctly play the chord $C_2$ before a time $t_{13}$ (see FIG. 5E) a hold will result since the terminal Z reverts to logical 0 at time $t_{13}$ after the melody timer 48 has reached a zero count. A logical 1 condition at terminal C of AND gate 182 results in a logical 1 condition at the terminal X of AND gate 182 so that terminal $H_R$ is at logical 1 (see FIG. 5B - $H_R$ at $t_6$).

At a time $t_{12}$ the student correctly plays the chord $C_2$ and the signal level at terminal L switches to logical 0. This in turn resets FLIP-FLOP 158 so that $Q_H = 0$, $\overline{Q}_H = 1$ which in turn results in a logical 0 condition on line 308 and a logical 0 condition on line 310. At $t_{13}$ a signal having a logical 1 state appears on line 212 thereby initiating the next advance cycle.

During the next advance cycle the chord word $C_3$ is read into the chord input/output circuit 36 and the melody word $M_5$ is read into the melody input/output circuit 34.

The sequence as described above continually repeats itself until the entire piece of music stored in the data storage element 28 has been read out of the data storage element and all of the chords have been correctly played by the student.

When the logic signal generated by the chord input/output circuit 36 and coupled via line 40 to terminal L of logic control circuit 20 changes state from logical 1 to logical 0 it indicates that the student has simultaneously played all of the correct chord notes. The signal at terminal L is coupled via lines 280 and 302 to input terminal A of EXCLUSIVE OR (EOR) gate 164.

In mode 1-A terminal B of EOR gate 164 is coupled via a line 321 to a contact A of the chord mode switch 24. Contact A of the chord mode switch is grounded and hence in a logical 0 state. When the student correctly plays the chord notes indicated by the keyboard lamps terminal A of EOR gate 164 switches to logical 0. As a result the output terminal X of EOR gate 164 on a line 322 and terminal B of OR gate 166 are in a logical 0 state.

Terminal A of OR gate 166 is coupled to contact C of switch 24 via lines 323, 252, the INVERTER 170 and lines 256, 240. As a result, the terminal A of gate 166 is always in a logical 0 state provided the mode switch 24 is not switched to the contact C position. Consequently, a line 326 and terminal A of AND gate 168 are at logical 0 (see FIG. 4–2 input AND gate). The input terminal B of AND gate 168 is connected to contact D of chord mode switch 24 via lines 304,306. Since contact D is open circuited in mode 1-A it is at logical 1. As a result, a line 327 and terminal L/$E_c$ coupled to the output terminal X of AND gate 168 are at logical 0. When terminal L/$E_c$ is in a logical 0 state, a chord lamp driver (to be described) in the chord input/output circuit 36 causes the keyboard lamps to be extinguished. This provides a visual indication to the student that he has played the correct chord notes.

If the student plays an indicated chord before he should, for example playing the chord $C_2$ after playing the note $M_2$ (see FIG. 2), the chord lamps indicating the chord $C_2$ will be extinguished. However, the chord lamps for the chord $C_3$, the next chord to be played, will not be illuminated until after the note $M_4$ has been played. If one or more of the chord keys for the chord $C_2$ is released in the interim period the lamps indicating the chord $C_2$ will be re-illuminated. If the keys for the chord $C_2$ are released before the lamp for the note $M_4$ is illuminated a hold will still occur after the note $M_4$ has been sounded. However, if the keys for the chord $C_2$ are released after the lamp $M_4$ is illuminated no hold will occur since the FLIP-FLOP 158 is reset by the flag bit in the data word for the not $M_4$ and the chord $C_3$ will be read into the chord input/output circuit 36.

Reference is now made to FIG. 6 to describe the operation of the chord input/output circuit 36. In the peferred embodiment of the invention each chord data word contains sufficient data to control 43 indicator lamps. Consequently, the chord input/output circuit 36 will require 43 separate but identical stages in order to store the bits of data. Due to space limitations and because all of the stages in the input/output circuit are identical only two stages are shown in FIG. 6.

The chord input/output circuit 36 includes a 43-stage shift register made up of 43 identically interconnected FLIP-FLOPS 350. The Q output terminal of each FLIP-FLOP 350 is connected to a D input terminal of the following FLIP-FLOP 350 via a line 354. The data is entered into the FLIP-FLOP via line 39 from terminal $D_c$ of the control logic circuit 20. The data on line 39 is coupled into the D terminal of the first FLIP-FLOP 350 in the chain via a line 352. The data is shifted one stage to the right from the Q output terminal of each FLIP-FLOP to the D input terminal of the succeeding FLIP-FLOP upon the occurrence of each clock pulse on line 135. As described above the data on line 39 changes as the memory address circuit is advanced by the clock pulses on line 43.

Figure 5A:
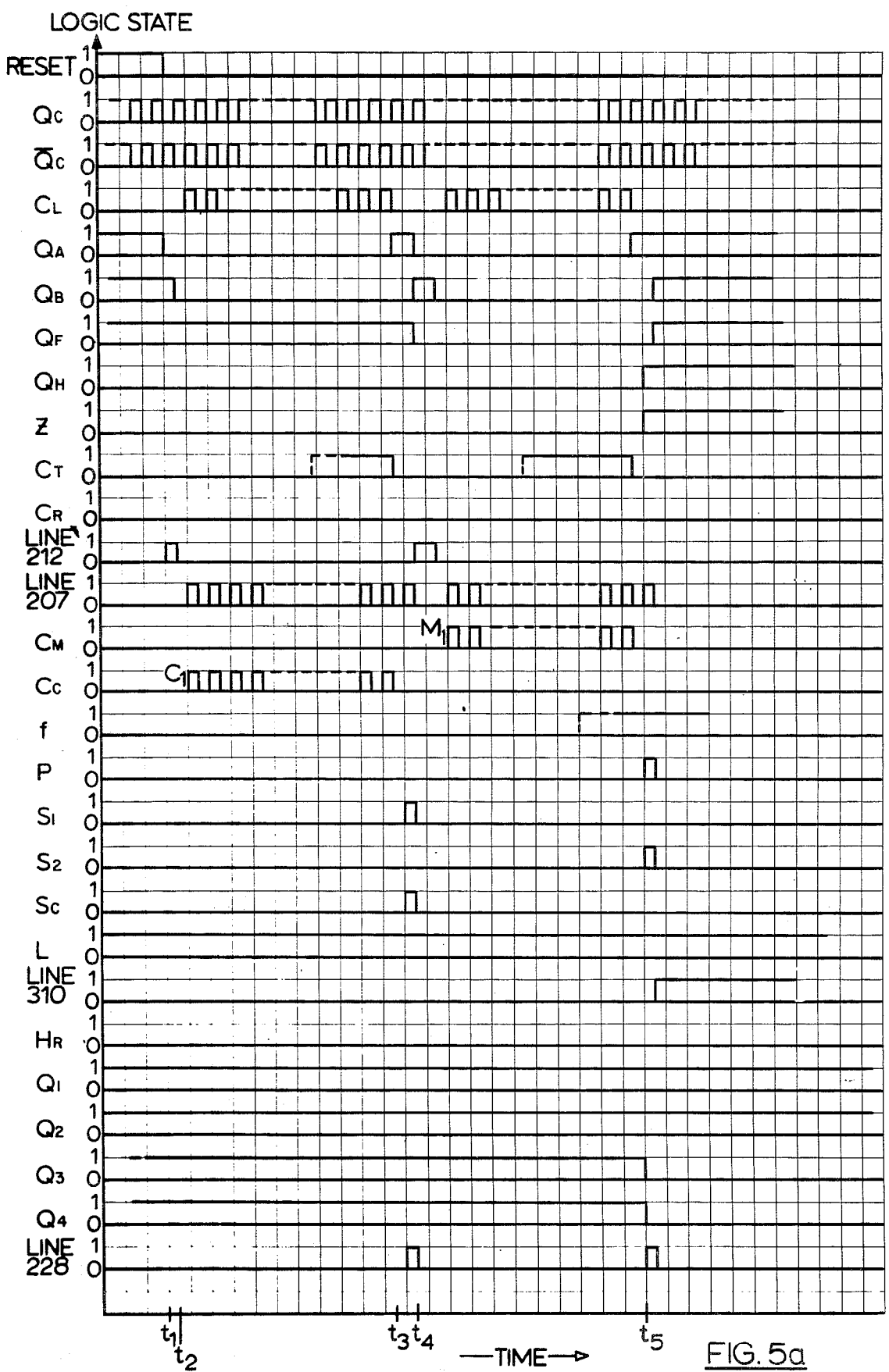

The 43 bits representing the chord word $C_1$ are entered into the chord input/output circuit 36 between the time $t_2$ and $t_3$ (see FIG. 5A – $C_c$ between times $t_2$ and $t_3$). The remaining 5 data bits, in the case of a chord word the bass note code data bits and the flag bit, are held in the 5-bit storage register 32.

Shortly after the time $t_3$ the data held in the 43 FLIP-FLOPS 350 is transferred into a latch circuit made up of 43 separate FLIP-FLOPS 356 by the strobe signal on lines 260, 360. The data stored in each FLIP-FLOP 350 is available at the Q output terminal of each FLIP-FLOP and is coupled to the respective latch FLIP-FLOP 356 via a line 358. The strobe pulse on line 260 is generated by the logic control circuit 20 between the times $t_3$ and $t_4$ (see FIG. 5A – $S_c$). Line 360 is coupled to the T intput of each FLIP-FLOP 356 via a line 362.

The latch FLIP-FLOP outputs are available at the Q output terminal of each of the latch FLIP-FLOPS 356. Terminal Q of each of the latch FLIP-FLOPS 356 is connected to an input terminal A of an INVERTER 364 via a line 366. The INVERTER 364 ouput terminal X is coupled by a resister 368 to a light emitting diode (LED) or other suitable lamp 370. The INVERTER circuit also functions as a current driver to deliver adequate current to each LED in order to illuminate it.

As described above, in connection with the operation of control logic circuit 20, when the student has correctly played all of the chord notes indicated by the keyboard lamps the signal on line 40 and at terminal L of the control logic circuit 20 switches to logical 0. The logic signal at terminal L of logic circuit 20 is generated by a series of 43 EXCLUSIVE NOR (ENOR) gates 372.

The ENOR gate 372 provide a comparison function comparing the logic state of the $\overline{Q}$ output terminal of each of the shift register FLIP-FLOPS 350 with the status of the chord keys. The ENOR gate input terminals A and B are connected to the $\overline{Q}$ output terminal of each FLIP-FLOP 350 and to each keyboard key 38 via lines 374 and 376 respectively. If a shift register FLIP-FLOP stage stores a logical 1 signal i.e. $Q = 1, \overline{Q} = 0$ and the corresponding keyboard key is played by the student thereby closing one of the switches 38 (see also FIG. 1) the inputs to both terminals A and B of the corresponding ENOR gate 372 will be at logical 0. The output terminal X of the ENOR gate 372 will therefore be in a logical 1 state. Correspondingly, if a shift register FLIP-FLOP stores a logical 1 at its $\overline{Q}$ output terminal and the corresponding keyboard key is not played so that the related key 38 is open both input terminals A and B of the ENOR gate 372 will be at logical 1 and again the output terminals X of the ENOR gate 372 will be at logical 1. (see FIG. 4 - ENOR gate). In any case where the logical levels at the input terminals A and B of a particular ENOR gate 372 are different the output terminal X of that ENOR gate will be at logical 0. Consequently, only if all and only all the correct keys are simultaneously played will the output terminal X of all of the ENOR gates 372 be at logical 1.

The output terminal X of each ENOR gate 372 is connected via lines 378 to a line 380. INVERTER 382, inverts and couples the signal on line 380 to line 384. Consequently, a logical 0 signal appears on line 384 only when all, and only all, the the indicated notes are simultaneously played by the student. The signal on line 384 is coupled to terminal L of control logic circuit 20 via line 40.

As previously described the logic signal on line 40 is coupled via lines 280, 302, EOR gate 164, OR gate 166 and AND gate 168 to line 327 and terminal L/$E_c$ is coupled via lines 386, 387 to a DRIVER 388. The output terminal X of the DRIVER 388 is coupled to a line 390. When the signal on lines 386, 387 and line 390 is at a logical 1 any LED 370 associated with a latch FLIP-FLOP 356 having a Q output terminal at logical 1 will be illuminated. Consequently, when terminal L and therefore lines 386, 387 and 390 switch to a logical 0 state (see FIGS. 5B, 5D) the LED's are extinguished.

The terminal S/$E_c$ (see FIGS. 1 and 3) on control logic circuit 20 is connected via lines 392 and 240 to contact C of the chord mode switch 24. In mode 1-A contact C of the chord mode switch 24 is in a logical 1 state and consequently terminal S/$E_c$ and lines 394 and 396 are at logical 1. An INVERTER 398 inverts the signal on line 396 resulting in the logical 0 signal on a line 400.

A series of 43 NAND gates (of which only 2 are shown in FIG. 6) are coupled to line 400 by lines 404 and to the Q output terminal of latch FLIP-FLOPS 356 via lines 406. When line 396 is in a logical 1 state, line 400 is at logical 0. Consequently, the logic state at the output terminal X of the NAND gates 402 and on lines 408 is at logical 0. When the present invention is used in modes 1-C, 2-C or 3-C (to be described) the signal on line 396 will be at logical 0 and the signal on line 400 at logical 1. If the signal at the input terminal A of any NAND gate 402 is at logical 1 the output of this NAND gate will be at logical 0.

The signal keyers (not shown) may be electronic solid state switches or electro-mechanical switches both of which are familiar to those skilled in the art. When any one or more of the lines 408 is in a logical 0 state the signal keyers are activated causing the notes indicated by the keyboard lamps to be sounded as well.

Reference is made to FIG. 7 to describe the operation of the melody input/output circuit 34. The melody input/output circuits is a simplified version of the chord input/output circuit 36 with the latching FLIP-FLOPS and ENOR gates removed. Latching is not required in the melody input/output circuit 34 since the progression of melody notes continues uninterrupted whether or not the student plays the note indicated by the keyboard lamp. A stop occurs only when the corresponding chord indicated by the keyboard lamps has not been correctly played.

The molody input/output circuit 34 includes a 43-stage shift register made up of 43 interconnected FLIP-FLOPS 420. Again, as in FIG. 6, only two stages are shown. Data from terminal $D_m$ on control logic circuit 20 is coupled to the melody input/output circuit 34 via line 37. The data on line 37 is coupled via a line 422 into the D terminal of the first FLIP-FLOP 420. The Q output at each successive FLIP-FLOP 420 is coupled via a line 424 to the D input terminal of the next FLIP-FLOP to the right. The data on line 422 enters the chain of FLIP-FLOPS 420 and is shifted one step to the right upon the occurrence of each clock pulse on line 43. Line 43 is coupled to each of the FLIP-FLOPS 420 via a line 426 and lines 428.

The 43 data bits representing the melody word $M_1$ are entered into melody input/output circuit 36 between the times $t_4$ and $t_5$ (see FIG. 5A - $C_m$). The remaining 5 data bits, representing the melody timing data and the flag bits, are held in the 5-bit storage register 32. The data stored in each of the FLIP-FLOPS 420 is available at the Q output terminal of each FLIP-FLOP on the lines 424. Each of the lines 424 is coupled via a line 430 to an INVERTER 432. The output terminal X of each of the INVERTERS 432 is coupled via a resister 434 to an LED 436. The INVERTERS 434 serve the same purpose as each INVERTER 364 shown in FIG. 6.

When the melody mode switch 22 is in a mode 1 or mode 2 position terminal $L/E_m$ of the control logic circuit 20, connected via lines 273, 271 to contact 3 of melody mode switch 22, is in a logicl 1 condition. As a result line 442 is in a logical 1 condition unless the melody mode switch 22 is in the mode 3 position.

The line 442 couples the terminal $L/E_m$ to a DRIVER 444 via a line 446. The output of the DRIVER 444 appears on line 448. Line 448 is always in a logical 1 state unless the melody mode switch 22 is in mode 3.

In modes 1 and 2 the particular LED 436 associated with the FLIP-FLOP 420 which contains a logical 1 signal at its Q output terminal will be illuminated thereby denoted the particular melody key to be played by the student.

When the melody timer 48 reaches a zero count (see FIGS. 5A, 5B, 5C and 5D) the terminal Z of the control logic circuit 20 switches to a logical 0 state. As described above in connection with FIG. 3 this condition initiates a new advance cycle causing the next melody word $M_2$ to be read out of the data storage element 28 and into the melody input/output circuit 34 (see also FIG. 5B at time $t_8$; FIG. 5C at time $t_9$; and FIG. 5D at time $t_{10}$).

The progression of melody notes in continually read from the data storage elemt 28 into the melody input/output circuit 34 independently of whether the student correctly plays the indicated melody notes. The sequence comes to a halt if the student fails to correctly play the associated chord notes as indicated by the lamps illuminated above the keyboard by the chord input/output circuit 36.

If the invention is operated in mode 2 (to be described) the melody notes are automatically sounded by signal keyers (not shown) in the same manner as the chord notes if the chord mode switch is in mode C (to be described).

A terminal $S/E_m$ on the control logic circuit 20 is connected via line 450 to contact 2 of the melody mode switch 22 and via line 452 to the melody input/output circuit 34. An INVERTER 454 is coupled to line 452 via line 456. The output terminal X of the INVERTER 454 is coupled to line 458. When lines 452, 456 are at logical 0 (mode 2) line 458 is at logial 1. Otherwise line 458 is in a logical 0 state.

A series of 43 NAND gates 460 (of which only two are shown) are connected to line 458 via lines 462 and to the Q output terminal of each of the FLIP-FLOPS 420 via lines 464. As in the case of NAND gate 402 (see FIG. 6) only when both input terminals A and B of the NAND gates 460 are in a logical 1 state is the output terminal X of that NAND gate at logical 0. When this condition prevails the particular signal keyer is coupled via a line 466 to a NAND gate 460 having a logical 0 state at its output terminal X causes the note illuminated to be automatically sounded.

The 5-bit storage register 32 shown in FIG. 1 is a conventional shift register familiar to those skilled in the art. The shift register is comprised of 5-FLIP-FLOPS inter-connected in the same manner as FLIP-FLOPS 350 or FLIP-FLOPS 420 in FIGS. 6 and 7 respectively. The 48 data bits making up each data word are read out of the data storage element 28 and are coupled into the 5-bit storage register 32 via line 46. All of the data bits are shifted through the storage register 32 by the clock pulses on line 41 except the last 5 data bits which are temporarily stored. The last 5 data bis comprise the flag bit and the melody timing data in the case of a melody word or the flag data bit and the bass note code in the case of a chord word.

The flag bit is coupled to a terminal F of the control logic circuit 20 via line 35. The remaining 4 data bits are transferred via line 54/56, 58/60, 62/64 and 66/68 to the melody timer 48 in the case of a melody word or to the 4-bit latch 70 in the case of a chord word.

If a melody word has been read out of the data storage element 28 the data on lines 54/56, 58/60, 62/64 and 66/68 is transferred into the melody timer 48 by the preset signal on line 154. The data presets the melody timer 48 to an initial count number.

If a chord word is read out of the data storage element 28 the data on lines 54/56, 58/60, 62/64 and 66/68 is transferred into the 4-bit latch 70 by the strobe pulse on line 72. In this case no signal appears on lne 154.

As described above the data on lines 54, 58, 62 and 66 is coupled into the 4-bit latch 70 or the melody timer 48 depending on the presence of a strobe signal on line 72 or a preset signal on line 154. The logic state of a flag bit in each word determines whether or not a strobe or a preset signal, on lines 72 and 154 respectively, is generated by logic circuit 20.

The 4-bit latches comprise four data storage elements similar to the FLIP-FLOPS 356 (see FIG. 6). The data bits are transferred into and stored in each FLIP-FLOP. The latch circuits 70,82 may take other forms familiar to those skilled in the art and need not be described in detail, here.

The data is transferred into the 4-bit latch 70 by the strobe signal on line 72 (see FIG. 5A–$S_1$ at time $t_3$ and $t_4$) and is transferred into a 4-bit latch 82 by a second strobe pulse generated by control logic circuit 20. The second strobe pulse appears at terminal $S_2$ and is coupled to the 4-bit latch 82 via line 92.

The strobe pulse at terminal $S_2$ is generated when AND gate 146 is enabled by a logical 1 flag bit. A melody word will contain a logical 1 flag bit only when the next word in the data stoage element 28 is a chord word (see FIG. 3 and FIG. 5).

The data in the 4-bit latch 82 is available in a binary coded form on lines 94, 96, 98, and 100. The data is subsequently decoded into 1 of 16 different outputs by an external circuit (not shown). The external circuit needed to decode the data will be familiar to those skilled in the art. The signals on the 16 different lines are used to operate signal keyers to sound bass accompaniment notes in the same way as the signal keyers described in connection with FIGS. 6 and 7.

Reference is now made to FIG. 8 which shows a simplified version of the melody timer 48. The melody timer is a presettable counter. Immediately after a melody word has been read out of the data storage element 28 the melody timer is preset to an initial count between 1 and 16 depending on the data contained in the last 4 bits of the melody word. Prior to time $t_1$ the melody timer was reset by reset switch 120. The logical 1 reset signal is coupled into the melody timer 48 via lines 199 and 480. The reset signal is coupled via line 480 to the S terminal at each of 5 FLIP-FLOPS 482, 484, 486, 488 and 490. The clock pulses generated by the rhythm unit oscillator 50 are coupled via line 52 to terminal $C_R'$ of melody timer 48. It should be noted that because of space limitations the clock pulses, generated by the rhythm unit oscillator 52 (see FIG. 5) are not draawn to the same time scale as the clock pulses generated by clock 26.

Prior to the time $t_1$ the signal on line 480 is in a logical 1 state and the signal at the R terminal of each of the FLIP-FLOPS 482, 484, 486, 488 and 490 is at logical 0 (to be described). As a result output terminals $Q_1$, $Q_2$, $Q_3$ and $Q_4$ are at logical 1 and the terminal $Z'$ is at logical 0 (see FIG. 5). When the logic level on line 480 switches to logical 0 at the time $t_1$ terminals $Q_1$, $Q_2$, $Q_3$ and $Q_4$ and $Z'$ do not change in logic state. However, the next signal pulse at a terminal T of each of the FLIP-FLOPS 482 through 490 will cause the logic state of the output terminals Q, $\overline{Q}$ of each FLIP-FLOP to change. (see FIG. 4, FLIP-FLOP truth table).

At the time $t_5$ AND gate 152 is enabled and the signal on lines 228,265 is transferred through the AND gate 152 and appears at terminal P of the control logic circuit 20. The preset signal at terminal P is coupled to terminal P' of the melody timer 48 via lines 154 and 492 to the input terminal A of AND gates 494, 496, 498 and 500 via lines 502, 504, 506 and 508. The preset signal enables the AND gates 494 through 500 allowing the data on lines 68/501, 64/503, 60/505 and 56/507 respectively to preset FLIP-FLOPS 482 through 490.

Figure 5B:
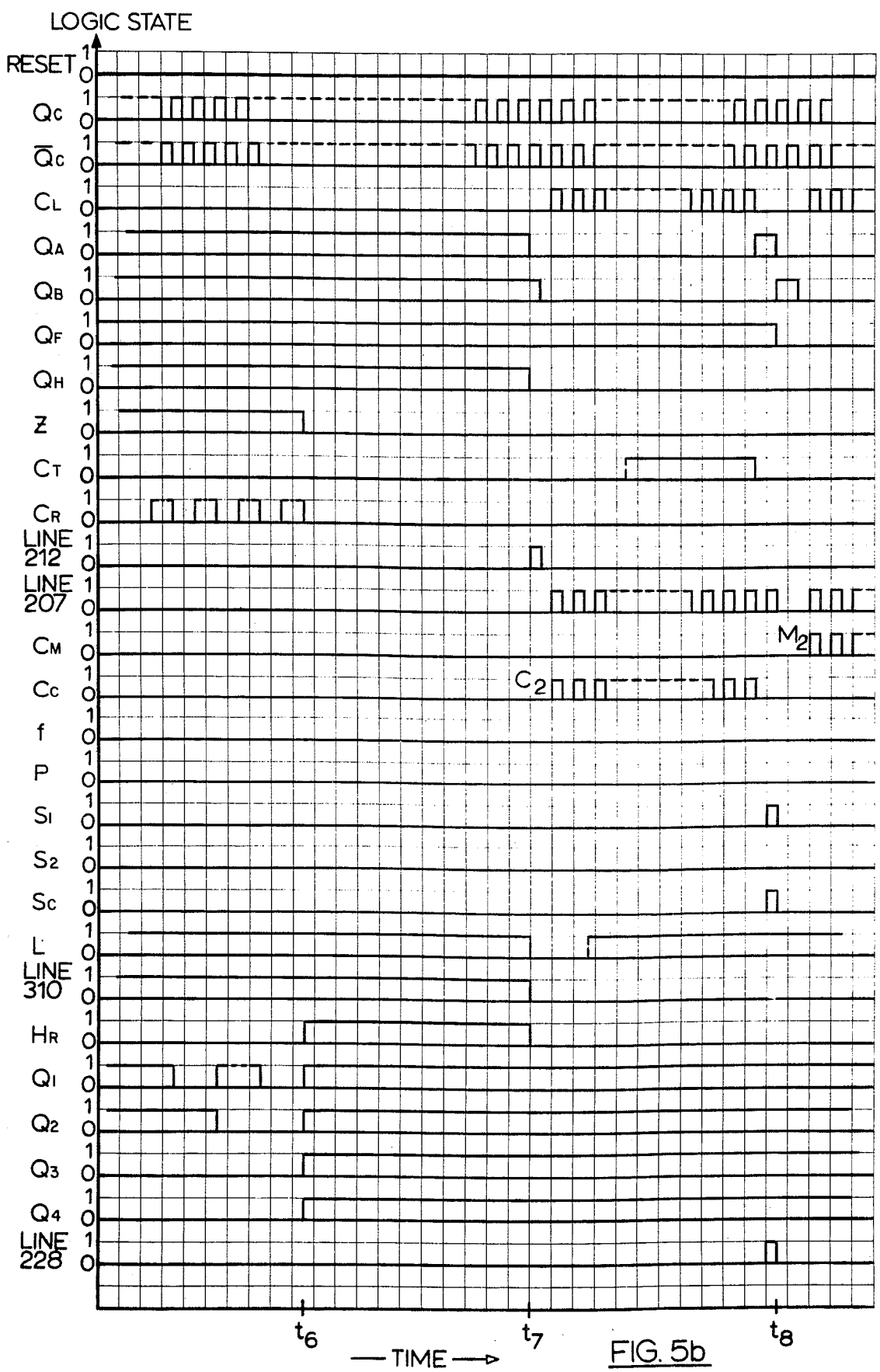
Figure 5C:
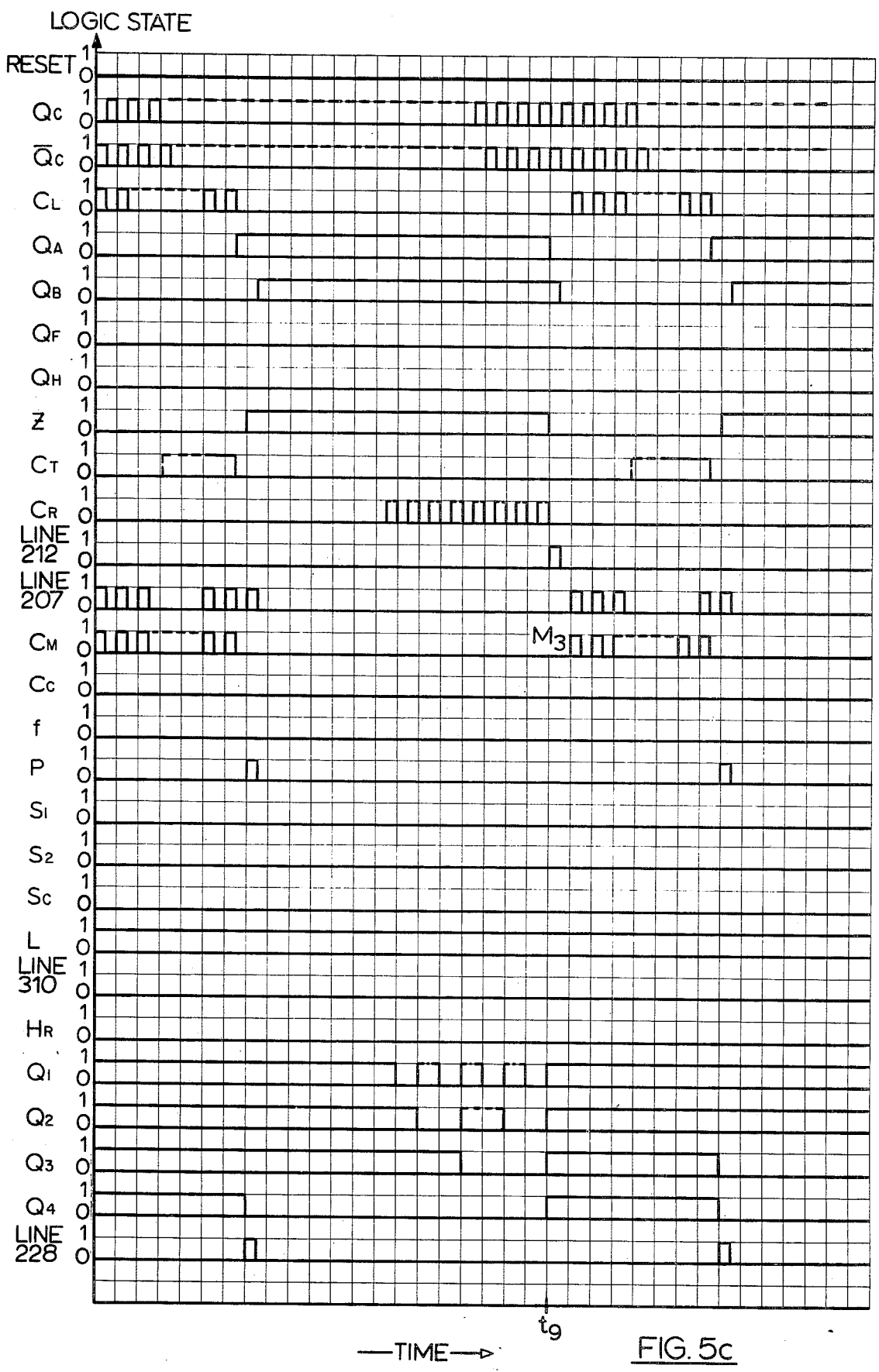
Figure 5D:
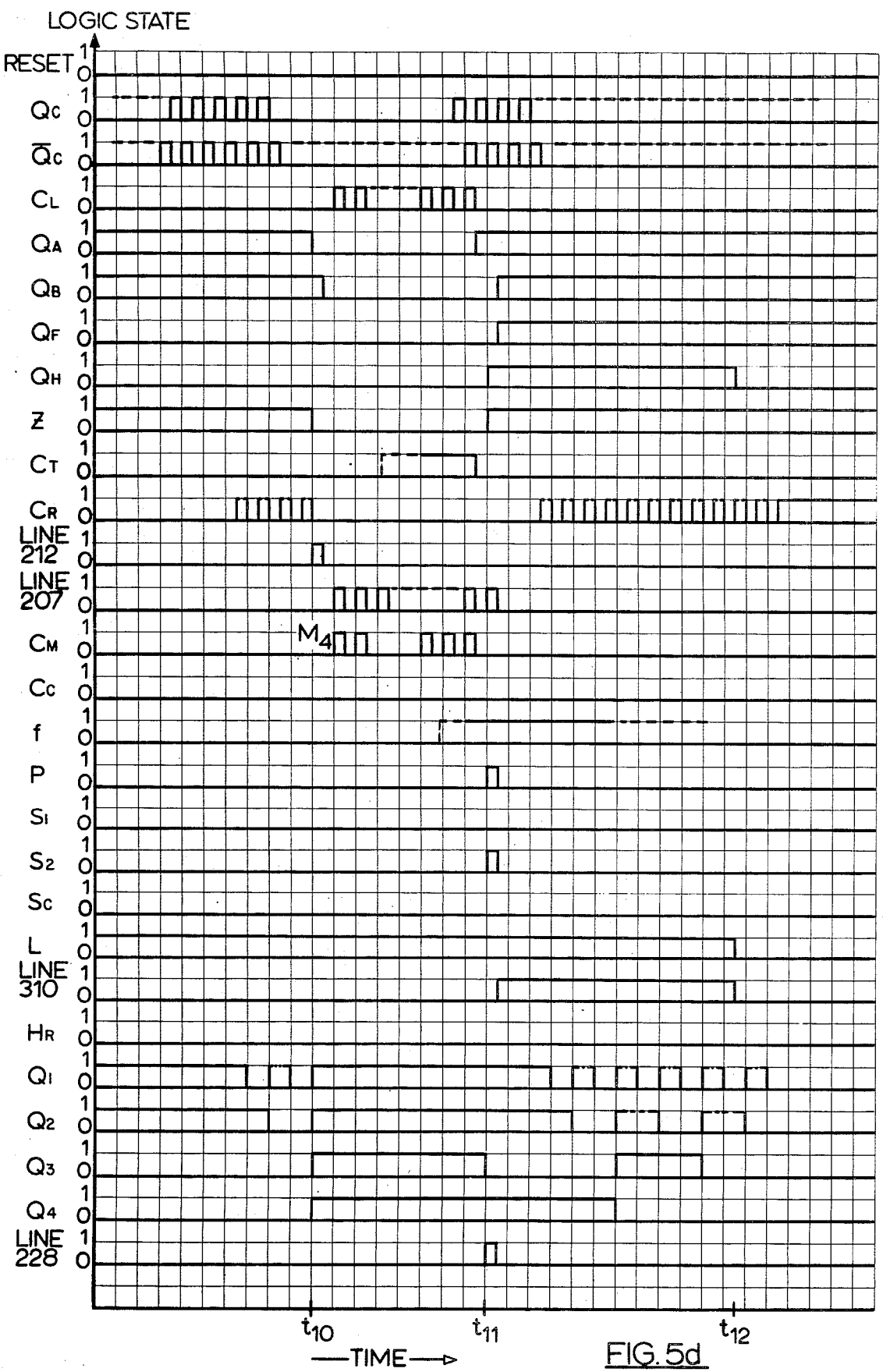
Figure 5E:
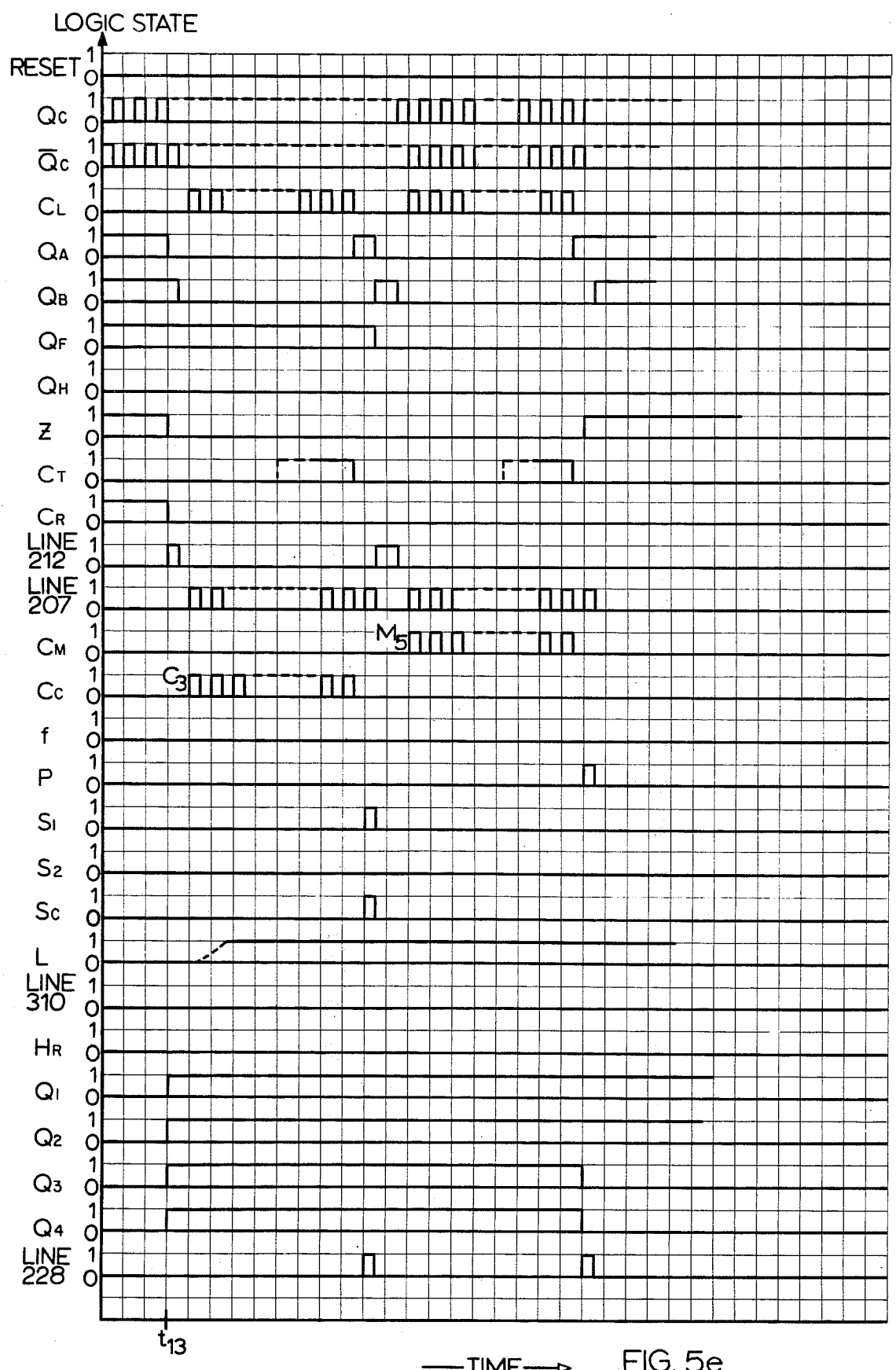

For the melody note $M_1$, a quarter note, the melody timer is preset at the time $t_5$ to a count of 4 (see FIGS. 5A, 5B). As a result, $Q_1 = Q_2 = 1$ and $Q_3 = Q_4 = 0$ and $Z$ ($\overline{Q}_5 = 1$). (See FIG. 5A - $Q_1$, $Q_2$, $Q_3$, $Q_4$ and Z at the time $t_5$).

The rhythm unit oscillator 50 is enabled at the time $t_1$ and clock pulses on line 52 enter the melody timer 48 on a line 510. The clock pulses are inverted by INVERTER 512 and are coupled into terminal T of FLIP-FLOP 482 via line 514. The Q output terminal of each FLIP-FLOP is connected to the T input terminal of the following FLIP-FLOP. The output signal from FLIP-FLOP 490 at terminal $\overline{Q}_5$ appears on line 516 is connected to the Z terminal on the control logic circuit 20 via line 51.

When the signal at terminal Z is in a logical 0 state all three input terminals of AND gate 182 are at logical 1. As a result terminal $H_R$ of logic circuit 20 is at logical 1 thereby inhibiting the rhythm unit oscillator 50 and terminating the clock pulses on line 52.

As previously described the system now waits for the student to correctly play the chord $C_1$ before a new advance cycle is initiated.

Reference is next made to FIG. 9 which shows data storage element 28 and data storage address circuit 42. In the preferred embodiment of the present invention the address circuit 42 includes a 3-bit divide by 6 counter circuit 540 and a 10-bit binary counter 542. The counters 540, 542 are coupled to reset switch 120 via lines 544 and 546.

The clock pulses on line 43 enter counter 540 via a line 548. The 3-bit counter 540 output signal appears on lines 550, 552 and 554 and is coupled into a decoder 556. The divide by 6 output appears on line 558 and operates the 10-bit counter 542.

The decoder 556 decodes the 3 data bits on lines 550, 552 and 554 and generates a signal on one of 6 output lines 560, 562, 564, 566, 568 and 570. The signal on each of these lines is used to enable one of six separate memory elements 574.

The 10-bit counter generates pulses on each of the 10 memory element address lines 576. The lines 576 are coupled to each of the memory elements 574. In this way each memory elements 574 is addressable in respect of 1,024 separate data bits. By coupling the clock pulses into the address circuit 42 the addresses in each of the memory elements 574 in the data storage element 28 can be interrogated and the data bits therein contained read out. The data is read out sequentially and appears on line 46.

Line 44 is connected to one of the lines 576 which generates a pulse after each group of 48 clock pulses on line 43. The signal on line 44 is coupled to the terminal $C_T$ of control logic circuit 20 and is used to trigger FLIP-FLOP 138 as described above.

Data may be read from a data storage input circuit 30 into the data storage element 28 via line 580. As previously described the data storage input may be obtained directly from the instrument keyboard or from a conventional program such as paper tape, magnetic tape, magnetic cards or punched paper cards.

Other memory organizations are possible depending on the number of notes to be controlled, the peripheral facilities included such as melody timing and bass note code and the memory capacity desired. The basic purpose of the data storage element 28 is to store the data representing the chord and melody notes for one or more pieces of music. The data is stored so that upon command it may be read out of the data storage element in serial form. The organization of such data storage element in its numerous forms is familiar to those skilled in the art.

The mode of operation of the embodiment of the invention described is changed from mode 1-A to mode 1-B by positioning the movable arm of the chord mode switch 24 to contact B. When the chord mode switch 24 is positioned at contact B, contacts, A, C and D are in a logical 1 state and contact B is at logical 0.

Operation in mode 1-B is virtually identical with operation in mode 1-A except the chord LED's 370 (see FIG. 6) are normally OFF and only flash ON to indicate that the student has correctly played the required chord notes. In the present apparatus the chord LED's 370 would flash ON between the times $t_7$ and $t_8$ and between the times $t_{12}$ and $t_{13}$ (see FIG. 5). The chord LED's 370 remain illuminated until the student releases one or more of the chord keys. A timing circuit (not shown) may be used to illuminate the chord LED's for a fixed time independent of how long the student depresses the instrument keys. Timing circuits of this type are familiar to those skilled in the art and will not be described in further detail here.

As described above with respect to mode 1-A the terminal $L/E_c$ on control logic circuit 20 is normally in a logical 1 state. After the student has correctly played all of the chord notes simultaneously teriminal L and terminal $L/E_c$ of the control logic circuit 20 change state from a logical 1 condition to a logical 0 condition. This causes the LED's 370 which were illuminated to be extinguished.

The operation of the chord lamps in mode 1-B will now be described. Contact A of switch 24 is in a logical 1 condition. The input terminal B of the EOR gate 164 is also at logical 1 rather than at logical 0 as is the case in mode 1-A. With terminal L in a logical 1 condition and line 302 and input terminal B of EOR gate 164 in a logical 1 condition (see FIG. 4-2 input EOR gate) the output terminal X of EOR gate 164 and line 326 are therefore in a logical 0 condition. Input terminal B of AND gate 168 is at logical 1 and input terminal A is at logical 0. As a result the output terminal X of AND gate 168 is at logical 0. Thus, the LED's 370 are disabled.

When the student plays the correct chord notes the signal lever at terminal L switches to logical 0 and terminal L/EC switches to logical 1. This in turn causes the LED's 370 to be illuminated assuming the lines 366 associated with the particular LED is in a logical 1 state.

Operation in mode 1-C allows the student to practice the melody notes for a particular piece of music stored in data storage elements 28 (see FIG. 2) while the chord notes are automatically sounded. As in mode 1-A the chord display lamps are illuminated indicated the chord notes which are to be sounded.

In mode 1-C contact C of chord mode switch 24 is grounded and therefore in a logical 0 condition. Consequently, lines 240, 392, terminal $S/E_c$ and line 394 are in a logical 0 state. The logical 0 signal on line 394 enables the NAND gates 402 (see FIG. 6). Under the above logic conditions when data is transferred into the latch FLIP-FLOPS 356 (see FIG. 6) a logical 1 signal at the Q output of any of the latch FLIP-FLOPS is coupled through the associated NAND gate 402 to line 408. The logical 0 state on line 408 operates the signal keyers causing the chord notes to be sounded automatically.

In mode 1-C since line 240 is at logical 0 input terminal A of the OR gate 166 is at logical 1 thereby disabling OR gate 166. In addition, both of the input terminals A and B of the AND gate 168 are at logical 1 so that the output terminal X of this AND gate is also at logical 1. Consequently, the chord LED's 370 are always enabled and will be illuminated to indicate the chord notes being sounded. In mode 1-C the logical level of terminal L has no effect at all on the operation of the system.

Terminal B of AND gate 160 is coupled via lines 238 and 240 to contact C of switch 24. As a result the output terminal X of AND gate 160 is always in a logical 0 condition in mode 1-C. This in turn results in a condition in which the output terminal X of AND gate 182 and terminal B of NOR gate 162 are always in a logical 0 condition. When these conditions prevail subsequent advance cycles in respect of both data readout from the data storage element 28 and holds on the rhythm unit oscillator 50 are inhibited.

The logical 0 state at contact C of switch 24 results in the AND gate 172 being disabled while AND gate 174 is enabled. As a result, the signal at terminal $S_c$ corresponds with the signal at terminal $S_2$ rather than at terminal $S_1$. Consequently, data transfer into the latch FLIP-FLOPS 356 (see FIG. 6) occurs at a later time in mode 1-C. The delay results in the chord notes being sounded at a time when they would normally be played, i.e. along with the melody note $M_4$ in the case of chord $C_2$. In mode 1-C it is not necessary as it is in modes 1-A and 1-B to pre-indicate the chord notes since the student is not playing the notes.

Operation in mode 1-D is initiated when the mode switch 24 is positioned at contact D. Contacts A, B and C are now in a logical 1 state and contact D in a logical 0 state. The B input terminal of AND gate 168 is now in a logical 0 state thereby disabling AND gate 168 and the chord LED's 370.

Terminal C of the AND gate 160 is in a logical 0 state thereby disabling the AND gate 182 so that holds in respect of the rhythm unit oscillator 50 are inhibited.

In response to the above logic conditions the melody notes alone are indicated in a timed sequence. The progression of melody notes continues until the entire piece of music in the data storage element 28 has been read out.

Operation in mode 2 occurs when the melody mode switch 22 is positioned at contact 2. Operation in modes 2-A, 2-B, 2-C and 2-D is essentially the same as operation in modes 1-A, 1-B, 1-C and 1-D. The main difference is in mode 2, terminal $S/E_m$ of control logic circuit 20 is in a logical 0 condition rather than a logical 1 condition. This in turn enables the NAND gates 460 (see FIG. 7) and permits automatic sounding of the melody notes.

The operation of the chord lamps is identical in both modes 1 and 2. In mode 2-A the student must simultaneously play the correct chord notes before the progression of chord and melody notes continues. In mode 2-B the chord lamps flash ON when the student simultaneously plays all the correct chord notes and the sequence then continues.

Mode 2-C is the mode in which the chord and melody notes are automatically sounded. The notes stored in the data storage element 28 are automatically read out into the melody and chord input/output circuits 34 and 36 respectively causing the signal keyers to automatically sound the notes as described above with reference to modes 2-A and 2-B.

In mode 2-D the apparatus automatically indicates and sounds the melody notes since terminal $L/E_m$ is in a logical 1 condition. No chord notes are indicated or sounded in mode 2-D since terminal $L/E_c$ and line 386 are in a logical 0 state.

Reference is now made to FIGS. 3 and 10 to describe the operation of the invention in mode 3. Mode 3 operation is initiated by switching the melody mode switch 22 to contact 3 thereby grounding line 273 and the terminal $L/E_m$. With terminal $L/E_m$ in a logical 0 condition the melody LED's 436 (see FIG. 7) are disabled preventing illumination of the melody note LED's. In addition, because input terminal B of AND gate 182 is at logical 0, line 322, terminal $H_R$ and line 324 are also in a logical 0 state. This inhibits holds on the rhythm unit oscillator 50.

In the same manner the output terminal X of AND gate 184 is also held at logical 0. As a result terminal A of NOR gate 162 is held at logical 0 and is independent of the logic level at terminal Z. This prevents the melody timer signal at terminal Z from initiating subsequent advance cycles.

Operation in mode 3-A is now described. An advance cycle is initiated at a time $t_a$ (see FIG. 10A). As described above with reference to FIGS. 3 and 5 the chord word $C_1$ is read into the chord input-output circuit 36 immediately after the reset switch 120 is operated. Because the next word is the melody word $M_1$, the data word chord $C_1$ has a logical 0 flag bit. AND gates 130 and 150 are therefore enabled and the melody word $M_1$ is read into the melody input/output circuit 34 at a time $t_b$.

At a time $t_c$ the flag signal is in a logical 1 condition since melody word $M_1$ has just been read out of the data storage element 28 indicating the next data word is a chord word. The signal on line 228 is coupled through AND gate 146 enabled by the logical 1 flag signal and sets FLIP-FLOP 158 so that $Q_H = 1$.

When all of the input terminals of AND gate 160 are in a logical 1 state, the signal on line 310 is also in a logical 1 condition thereby causing the signal on line 212 to switch to logical 0. This in turn inhibits a further advance cycle. The data readout sequence now stops awaiting the student to correctly play the indicated chord notes.

At a time $t_d$ the student having correctly played all of the chord notes the signal at terminal L of control logic circuit 20 switches back to a logical 0 condition. FLIP-FLOP 158 is reset so that $Q_H = 0$. Line 310 now switches to a logical 0 condition and the output terminal X of NOR gate 162 and line 212 switch to a logical 1 state. This in turn triggers a new advance cycle.

The new advance cycle causes the chord word $C_2$ to be read out of the memory storage element 28 and into the chord input/output circuit 36. The logical 0 flag signal associated with the chord word $C_2$ initiates a further advance cycle in the same manner as described above in mode 1-A. The AND gates 182 and 184 are disabled so that NOR gate 162 is inoperative in respect of the logic signals at terminal Z of the control logic circuit 20. Terminal $H_R$ is at logical 0 so that the rhythm unit oscillator 50 is left free running. Consequently, the melody words are read out of the data storage element 28 in rapid succession until a flag signal having a logical 1 condition is encountered. At a time $t_e$ (see FIG. 10), the logical 1 flag signal causes the signal at terminal S of FLIP-FLOP 158 to switch the FLIP-FLOP so that $Q_H = 1$. This inhibits any further advance cycles. Once again as in mode 1-A the readout process is halted and awaits the student correctly playing the illuminated chord notes for the chord $C_2$.

Operation of the preferred embodiment of the present invention in modes 3-B and 3-C is much the same as operation in mode 3-A in respect of the circuitry controlled by the melody mode switch 22. Operation of the logic circuitry shown in FIG. 3 and 6 controlled by the chord mode switch 24 is the same as previously described in respect of modes 1-B and 1-C, and modes 2-B and 2-C.

Operation in mode 3-B requires a variable delay circuit (not shown) to control the time periods between the time a chord has been correctly played and the chord lamps go out and time the chord lamps are re-illuminated to indicate the next chord. Variable delay circuits are familiar to those skilled in the art and need not be described here.

In mode 3-D the positions of the melody mode switch 22 and the chord mode switch 24 are switched to contacts 3 and D respectively. The control logic circuit 20 is now disabled.

The present embodiment of the invention may be modified to include a key transposer (not shown) to shift the key of the music stored in the data storage element 28. For example, a piece of music written and programmed in the key of C may be shifted downwards in key two steps to the key of B flat or upwards five steps to a key of F. Although a key transposer feature is most useful if the data storage element 28 is being programmed directly from the instrument keyboard itself it is also useful in the case of paper tape or magnetic tape programming allowing the student to alter the key in which the music is stored.

The circuitry necessary to implement key transposition may take numerous forms which will be apparent to those skilled in the art. For example, an up-down shift register may be used instead of an up-type shift register in the melody and chord input/output circuits 34, 36. The clock 26 in the control logic circuit 20 is modified to provide additional clock pulses to shift the data transferred into the melody and chord input/output circuits up or down a number of positions after each advance cycle.

Modifications of the 4-bit latch 70 would also be required so that the bass note code would correspond to the transposed chord notes. In this case, the 4-bit latch would take the form of a 4-bit divide by 12 presetable up-down counter.

It will be understood that numerous modifications can be made to the embodiment of the invention described above without departing from either the scope or spirit of the invention. The organization of the data stored in the data storage element and the manner in which the data is transferred into the melody and chord input/output circuits may be modified in a variety of ways familiar to those skilled in the art.

For example, the relative positions, polarities and number of data bits in each data word can be altered. The order in which the chord and melody words are stored in the data storage element may also be altered.

The organization and interconnection of the logic elements in control logic circuit 20 and in the associated circuitry including the melody timer, rhythm unit oscillator and the melody and chord input/output circuits may be varied while still accomplishing the same basic functions as described above in relation to the preferred embodiment of the invention.

The present invention can also be used with other types of keyboard instruments especially the piano. When used with the piano or related keyboard instruments Modes 1-A, 1-B, 1-D, 3-A and 3-B could readily be used. However, employing electromechanical means (not shown) familiar to those skilled in the art to operate the keyboard keys or to directly operate the hammer, causing them to strike the strings the present invention could be readily operated in the automatically play modes (Modes 1-C, 2-B, 2-C, 2-D and 3-C) as well.

What I claim is:

1. Apparatus for teaching a student to play a musical instrument comprising:
   a. programmable data storage means for storing a plurality of predetermined data words, said data words containing elements which are indicative of predetermined musical notes to be played, said data words being stored at known locations in said data storage means,
   b. controllable logic means coupled to said data storage means for selecting predetermined data words and reading out said selected data words from said data storage means in response to a control signal,
   c. means for sensing the notes which have been played,
   d. means coupled to said sensing means for generating said control signal after said notes have correctly been played, and
   e. display means coupled to said logic means for indicating visually the notes corresponding to the respective read-out data words.

2. Apparatus as claimed in claim 1 wherein said controllable logic means includes means for temporarily storing said read-out data words until after the notes indicated by said data words have correctly been played.

3. Apparatus as claimed in claim 1 wherin said data words comprise timing elements which are indicative of the length of time said notes are to be held, and wherein means responsive to said timing elements is provided for initiating said control signal to thereby cause said logic means to select new data words from said data storage means after a period of time indicated by said timing elements.

4. Apparatus as claimed in claim 2 wherein said data words comprise timing elements which are indicative of the length of time said notes are to be held, and wherein means responsive to said timing elements is provided for initiating said control signal to thereby cause said logic means to select new data words from said data storage means after a period of time indicated by said timing elements.

5. Apparatus for teaching a student to play a musical instrument comprising:
   a. programmable data storage means for storing a plurality of predetermined data words, said data words containing a predetermined number of data elements, said data words comprising chord words and melody words indicative of a series of predetermined musical notes to be played in a predetermined order on said musical instrument, each chord word containing data elements representative of a musical chord, each melody word containing data elements representative of at least one melody note and timing information pertaining to each melody note, each chord and melody word containing a flag element for indicating whether each following data word is a chord word or a melody word, said data words being stored in said data storage means at known addressable locations,
   b. first data word storage register means operable to receive and store the data elements in a single chord word including first display means for visually identifying each of the chord notes represented by the data elements in the chord word,
   c. second data word storage register means operable to receive and store the data elements in a single melody word including second display means for visually identifying the melody note or notes represented thereby;
   d. controllable logic means coupled to said data storage means and responsive to said flag element for transferring data words from said data storage means into either of said first and second data word storage register means as determined by said flag element, said logic means being operable to transfer said data words upon receipt of a control signal,
   e. means for sensing the notes which have been played and,
   f. means coupled to said sensing means for generating said control signal after said notes have correctly been played.

6. Apparatus as claimed in claim 5 wherein each chord word contains elements indicative of a selected bass note to be played contemporaneously with a predetermined chord.

7. Apparatus as claimed in claim 5 wherein said musical instrument is an electronic organ having signal keyers and wherein said first and second data storage register means each include means connectible to said signal keyers for automatically sounding the chord and melody notes represented by the data words in said first and second data storage register means.

8. An apparatus for teaching a student to play a musical instrument comprising:
   a. data storage means for storing data representing a plurality of predetermined notes comprising a musical passage, said data being arranged into data words comprising chord words and melody words each containing a predetermined number of data elements, each chord word containing data elements representing a chord, each melody word containing data elements representing a melody note and timing for the melody note, each chord and melody word containing a flag element for indicating whether each following data word is a chord word or a melody word, said data words being stored in said data storage means at known addressable locations;
   b. first data word storage register means coupled to said data storage means and responsive to the data elements in each chord word for visually indicating to the student the cord notes represented by the data elements in the chord word and including first circuit means for generating a first control signal when all of said identified chord notes have been played by the student;
   c. second data word storage register means responsive to the data elements in each melody word and including second display means for visually indicating to the student the melody note/represented by the data elements in each melody word;
   d. second circuit means coupled to said data storage means and to said second data word storage register means and operable to generate a second control signal responsive to said data elements representing timing for controlling said second display means;
   e. third circuit means coupled to said data storage means and responsive to said flag elements for generating a flag signal which is indicative of whether the following data word to be read out of said data storage means is a chord word or a melody word; and
   f. control logic means coupled to said data storage means and to said first and second data storage register means and responsive to said flag signal for selectively transferring a selected portion of said following data word into said first data storage register or into said second data storage register and for generating a third control signal to operate said second circuit means when a melody word is read out of said data storage register, whereby the transfer of data words is inhibited by a subsequent flag signal indicating that the following data word to be read out of said data storage means is a chord word and is restarted by said first control signal.

9. Apparatus as claimed in claim 8 wherein each chord word contains elements indicative of a selected bass note to be played contemporaneously with a predetermined chord.

10. Apparatus as claimed in claim 8 wherein said musical instrument is an electronic organ having signal keyers and wherein said first and second data storage register means each include means connectible to said signal keyers for automatically sounding the chord and melody notes represented by the data words in said first and second data storage register means.

* * * * *